(12) United States Patent
Tanizawa

(10) Patent No.: US 10,979,220 B2
(45) Date of Patent: Apr. 13, 2021

(54) COMMUNICATION DEVICE, COMMUNICATION METHOD, AND COMMUNICATION METHOD FOR PERFORMING COMMUNICATION USING SHARED QUANTUM KEY

(71) Applicant: Kabushiki Kaisha Toshiba, Minato-ku (JP)

(72) Inventor: Yoshimichi Tanizawa, Yokohama (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 241 days.

(21) Appl. No.: 15/432,266

(22) Filed: Feb. 14, 2017

(65) Prior Publication Data

US 2018/0062837 A1 Mar. 1, 2018

(30) Foreign Application Priority Data

Aug. 31, 2016 (JP) .............................. JP2016-169986

(51) Int. Cl.
*H04L 29/06* (2006.01)
*H04L 9/08* (2006.01)

(52) U.S. Cl.
CPC .............. *H04L 9/0852* (2013.01); *H04L 9/08* (2013.01)

(58) Field of Classification Search
CPC ................................ H04L 9/0852; H04L 9/08
See application file for complete search history.

(56) References Cited

U.S. PATENT DOCUMENTS

| 7,068,790 | B1 | 6/2006 | Elliott | |
|---|---|---|---|---|
| 7,457,416 | B1* | 11/2008 | Elliott | H04L 9/0852 380/256 |
| 2008/0175385 | A1* | 7/2008 | Lee | H04B 10/70 380/256 |
| 2012/0177201 | A1* | 7/2012 | Ayling | H04B 10/70 380/278 |
| 2013/0208894 | A1* | 8/2013 | Bovino | H04L 9/0852 380/278 |

(Continued)

FOREIGN PATENT DOCUMENTS

| JP | 2005-117511 A | 4/2005 |
|---|---|---|
| WO | WO 2010/064004 A2 | 6/2010 |
| WO | WO 2013/014734 A1 | 1/2013 |

*Primary Examiner* — Harunur Rashid
(74) *Attorney, Agent, or Firm* — Oblon, McClelland, Maier & Neustadt, L.L.P.

(57) ABSTRACT

A communication device includes a plurality of key distributing units, a plurality of communicating units, a monitoring unit, and a switching unit. The plurality of key distributing units have a quantum key distribution function for sharing a quantum key with an external distribution device. The plurality of communicating units communicate with an external communication device using the quantum key. The monitoring unit monitors operational status indicating at least one of transmission-reception status of photons in the quantum key distribution function, generation status of generating the quantum key, and obtaining status of obtaining the quantum key. The switching unit switches a control target, which either represents one of the key distributing units or represents one of the communicating units, from a first control target to a second control target other than the first control target according to the operational status.

11 Claims, 19 Drawing Sheets

(56) References Cited

U.S. PATENT DOCUMENTS

| | | | | |
|---|---|---|---|---|
| 2013/0251145 A1* | 9/2013 | Lowans | ................ | H04L 9/0838 380/44 |
| 2014/0331050 A1* | 11/2014 | Armstrong | ............ | H04L 9/0855 713/171 |
| 2016/0127127 A1* | 5/2016 | Zhao | .................... | H04L 9/0852 713/171 |

* cited by examiner

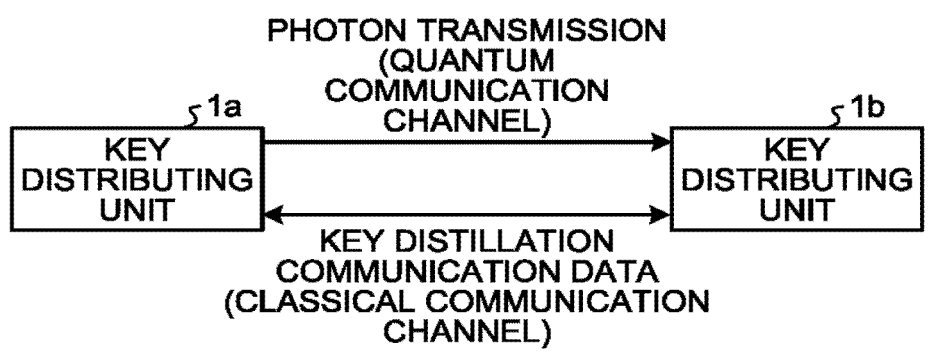
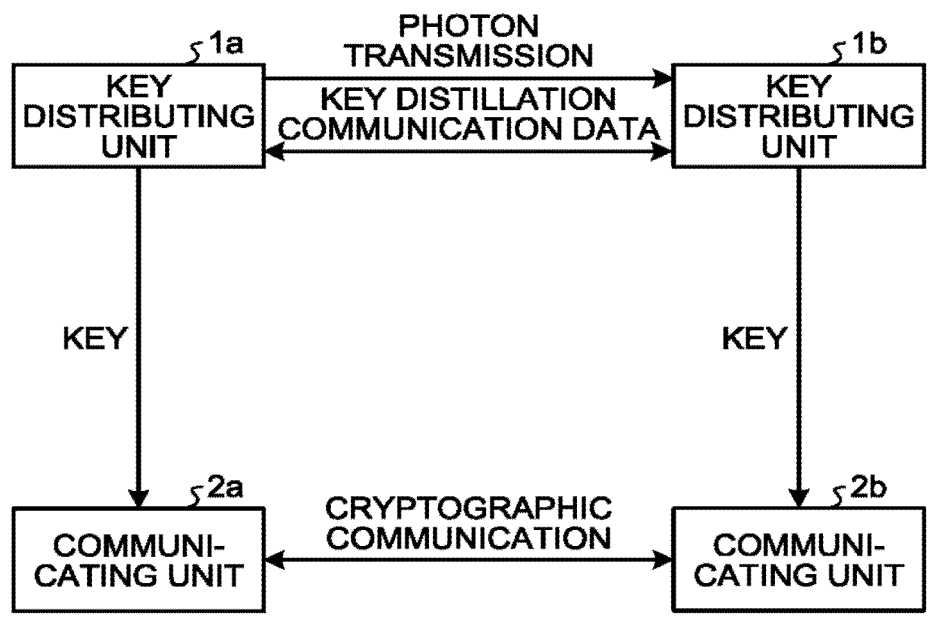

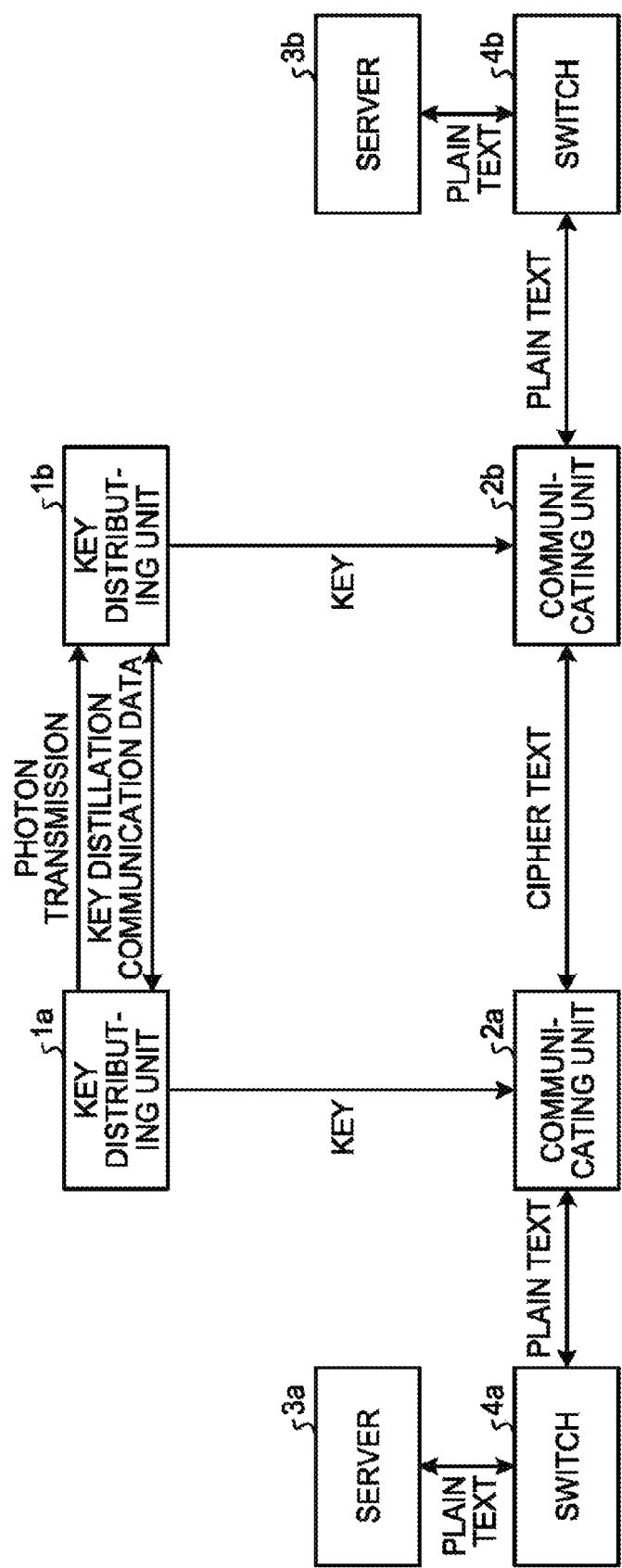

COMMUNICATION DEVICE, COMMUNICATION METHOD, AND COMMUNICATION METHOD FOR PERFORMING COMMUNICATION USING SHARED QUANTUM KEY

CROSS-REFERENCE TO RELATED APPLICATIONS

This application is based upon and claims the benefit of priority from Japanese Patent Application No. 2016-169986, filed on Aug. 31, 2016; the entire contents of which are incorporated herein by reference.

FIELD

Embodiments described herein relate generally to a communication device, a communication method, and a communication system.

BACKGROUND

The quantum key distribution (QKD) technology is a technology in which keys enabling cryptographic data communication are shared in safety between a quantum key distribution transmitter (a QKD transmitter), which successively transmits single photons, and a quantum key distribution receiver (a QKD receiver), which receives single photons. For example, the QKD transmitter is installed at a base location PA, and the QKD receiver is installed at a base location PB.

Consider a case in which a communication system including a QKD transmitter and a QKD receiver is used as a cryptographic communication infrastructure. The cryptographic communication infrastructure is used in performing communication among the base locations of, for example, business enterprises, governments, or public offices; as well as is used by telecommunication carriers in providing communication services. The data that is communicated often has a high degree of confidentiality and often represents critical data. Hence, not only it is necessary to provide high communication security, it is also necessary to ensure a high degree of reliability. For example, it is necessary to ensure that the communication service does not get terminated (the communication is not discontinued) to the utmost extent.

BRIEF DESCRIPTION OF THE DRAWINGS

FIG. 1 is a diagram illustrating an exemplary configuration of a quantum key distribution (QKD) system;

FIG. 2 is a diagram illustrating an exemplary configuration of a QKD communication system;

FIG. 3 is a diagram illustrating an exemplary configuration of a QKD communication infrastructure system;

DETAILED DESCRIPTION

Figure 4:
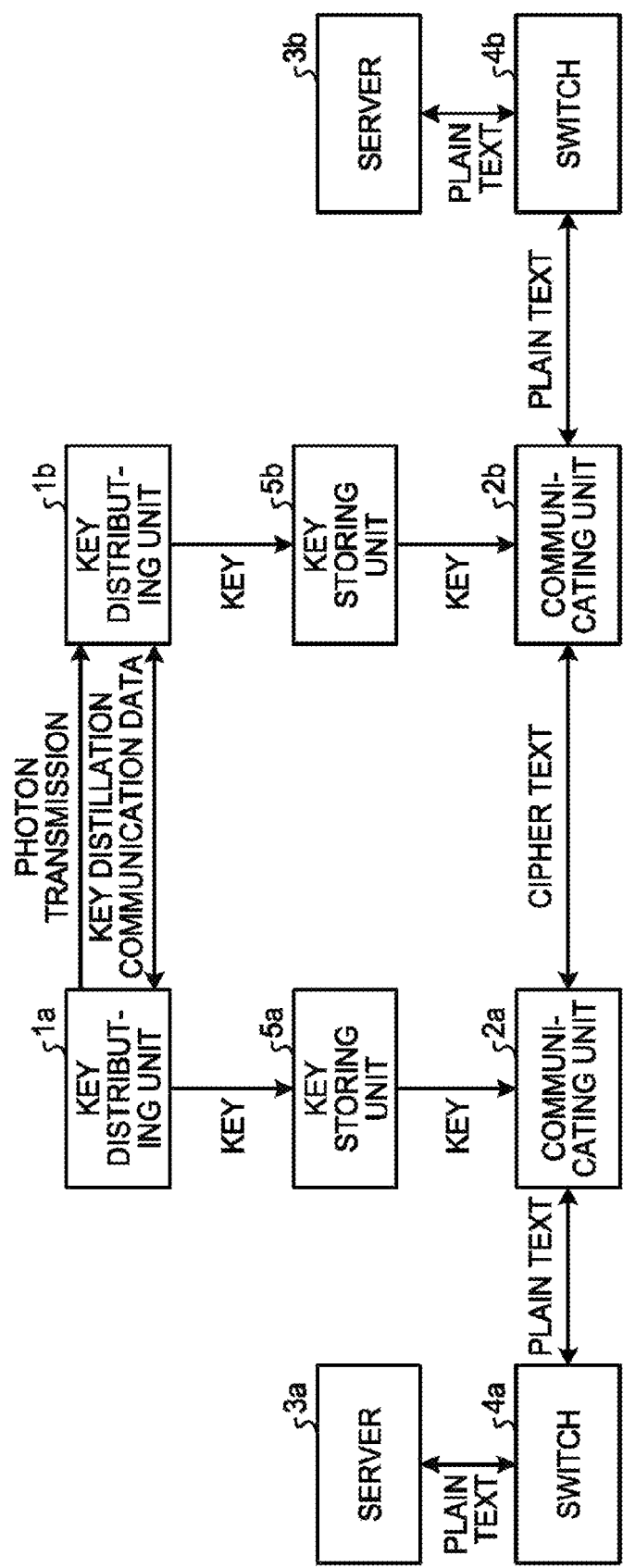
FIG. 4 is a diagram illustrating another exemplary configuration of the QKD communication infrastructure system.

According to one embodiment, a communication device includes a plurality of key distributing units, a plurality of communicating units, a monitoring unit, and a switching unit. The plurality of key distributing units have a quantum key distribution function for sharing a quantum key with an external distribution device. The plurality of communicating units communicate with an external communication device using the quantum key. The monitoring unit monitors operational status indicating at least one of transmission-reception status of photons in the quantum key distribution function, generation status of generating the quantum key, and obtaining status of obtaining the quantum key. The switching unit switches a control target, which either represents one of the key distributing units or represents one of the communicating units, from a first control target to a second control target other than the first control target according to the operational status.

Exemplary embodiments of a communication device according to the invention are described below in detail with reference to the accompanying drawings.

Firstly, the explanation is given about a system in which the QKD technology is implemented. In order to share keys using the QKD technology, it becomes necessary to perform photon transmission from the QKD transmitter to the QKD receiver as well as to perform what is called key distillation in which exchange of control data is performed between the QKD transmitter and the QKD receiver via a classical communication channel (key distillation control data communication). Herein, a key represents shared information that is shared between a QKD transmitter and a QKD receiver, and represents, for example, a random number sequence made of digital data. The QKD transmitter and the QKD receiver are collectively referred to as key distributing units. Based on the principles of quantum mechanics, it is guaranteed that the keys shared using the quantum key distribution (QKD) technology do not get wiretapped.

FIG. 1 is a diagram illustrating an exemplary configuration of a QKD system including a QKD transmitter and a QKD receiver. As illustrated in FIG. 1, the QKD system includes key distributing units 1a and 1b. For example, the key distributing unit 1a is equivalent to a QKD transmitter, and the key distributing unit 1b is equivalent to a QKD receiver. Alternatively, the key distributing unit 1a as well as the key distributing unit 1b can have the functions of a QKD transmitter and a QKD receiver. When the key distributing units 1a and 1b have identical functions and need not thus be distinguished from each other, they are simply referred to as the key distributing unit 1.

The transmission and reception of photons (photon transmission) and the communication of control data for key distillation (key distillation communication data) can be performed using different channels of the same optical channel or can be performed using different optical fibers.

The keys shared by the QKD system can be used in performing cryptographic communication. A key shared by the QKD system has an extremely high degree of safety and is guaranteed to be safe from being wiretapped. For that reason, as a result of performing cryptographic communication using such a key, it becomes possible to perform highly secure communication.

FIG. 2 is a diagram illustrating an exemplary configuration of a QKD communication system that includes a QKD transmitter, a communicating unit connected with the QKD transmitter, a QKD receiver, and a communicating unit connected with the QKD receiver. As illustrated in FIG. 2, the QKD communication system includes the key distributing units 1a and 1b, and includes communicating units 2a and 2b. When the communicating units 2a and 2b need not be distinguished from each other, they are simply referred to as the communicating unit 2. Meanwhile, regarding the key distributing unit 1 and the communicating unit 2; either physically different devices can be used, or the physically same device can be configured to have both functions.

Between the key distributing unit 1a (the QKD transmitter) and the key distributing unit 1b (the QKD receiver), keys that are guaranteed to be safe from being wiretapped can be shared. Regarding such a key, the key distributing unit 1a transmits the key to the communicating unit 2a, and the key distributing unit 1b transmits the key to the communicating unit 2b.

The communicating units 2a and 2b perform cryptographic communication using the key received from the key distributing units 1a and 1b, respectively. Herein, it is possible to implement any cryptographic algorithm, such as the advanced encryption standard (AES) or the one-time pad (OTP), in the communicating units 2a and 2b.

When the communicating unit 2 performs cryptographic data communication using the OTP, it is guaranteed according to the information theory that no wiretapper having whatever knowledge can decipher the cryptographic data. The OTP is a method in which encryption and decryption is performed using keys having the same length as the length of the transmitted and received data, and a key when used once is thrown away without reusing it. In the OTP, although it is possible to ensure the security guaranteed according to the information theory, the cryptographic keys are used and thrown away at the same rate as the rate of using cryptographic data. Hence, the key distributing unit 1 needs to provide the cryptographic keys at a fast pace to the communicating unit 2.

In the case of using block encryption such as the AES, although the safety according to the information theory is not satisfied, the practical communication security can be maintained at an extremely high level by increasing the frequency of updating cryptographic keys. In the AES, the frequency of updating cryptographic keys has an upper limit that is set depending on the generation rate and the provision rate of the cryptographic keys provided by the key distributing unit 1. Typically, it can be believed that, higher the frequency of updating cryptographic keys, the higher becomes the security of the cryptographic communication.

Herein, the consideration is given to the direction of cryptographic communication. The terms "QKD transmitter" and "QKD receiver" are used to indicate nothing more than the side that transmits photons and the side that receivers photons during quantum key distribution. Regarding the cryptographic communication that is performed using cryptographic keys generated as a result of quantum key distribution, any one of the following directions is possible.

(D1) Cryptographic communication from the communicating unit 2a, which receives a cryptographic key from the QKD transmitter (the key distributing unit 1a), to the communicating unit 2b, which receives a cryptographic key from the QKD receiver (the key distributing unit 1b).

(D2) Cryptographic communication from the communicating unit 2b, which receives a cryptographic key from the QKD receiver (the key distributing unit 1b), to the communicating unit 2a, which receives a cryptographic key from the QKD transmitter (the key distributing unit 1a).

(D3) Cryptographic communication in the direction D1 as well as the direction D2 (full-duplex cryptographic data communication).

However, herein, synchronization of cryptographic keys can become an issue. When the OTP is used as the cryptographic algorithm, the key used as the encryption key in one communicating unit 2 needs to be used as the decryption key in the other communicating unit 2. For example, in full-duplex cryptographic data communication, the entire QKD communication system needs to be controlled in such a way that, from among the keys shared between the QKD transmitter and the QKD receiver, a key used as the encryption key in one communicating unit 2 (for example, the communicating unit 2a) is used as the decryption key in the other communicating unit 2 (for example, the communicating unit 2b) or a key used as the decryption key in one communicating unit 2 (for example, the communicating unit 2a) is used as the encryption key in the other communicating unit 2 (for example, the communicating unit 2b).

Such control is hereinafter called key synchronization. Before the key distributing unit 1 provides a key to the communicating unit 2, the key synchronization can be achieved among a plurality of key distributing units 1 by performing communication for key synchronization. Alternatively, before the communicating unit 2 uses a key, the key synchronization can be achieved among a plurality of communicating units 2 by performing communication for key synchronization. Still alternatively, the key synchronization can be achieved by a plurality of other devices (such as key storing devices) by performing communication for key synchronization.

In the AES, typically, at the side at which encryption is performed before transmission and at the side at which decryption is performed after reception; the operations are performed based on identical keys. Hence, the key synchronization explained above need not be performed.

FIG. 3 is a diagram illustrating an exemplary configuration of a QKD communication infrastructure system. The QKD communication infrastructure system is a system that uses the QKD communication system as a cryptographic communication infrastructure. As illustrated in FIG. 3, the QKD communication infrastructure system includes the key distributing units 1a and 1b, the communicating units 2a and 2b, servers 3a and 3b, and switches 4a and 4b. The servers 3a and 3b are servers (operation servers) having an application function that uses cryptographic communication. The switches 4a and 4b are switches such as layer-3 switches (L3SW) that connect cryptographic communication applications with the communicating units 2.

In such a configuration, the communicating units 2 can have only the encryption function and the communication function. Moreover, the communicating units 2 may or may not have the functions of the switches 4a and 4b. Furthermore, as long as the servers 3 are the subject of cryptographic communication, they can be of any type. Moreover, the number of the servers 3, the types of the servers 3, and the method of connection between the servers 3 and the communicating units 2 is arbitrary in nature.

FIG. 4 is a diagram illustrating another exemplary configuration of the QKD communication infrastructure system. As illustrated in FIG. 4, the QKD communication infrastructure system includes key distributing units 1a and 1b, the communicating unit 2a and 2b, the servers 3a and 3b, the switches 4a and 4b, and key storing units 5a and 5b.

The QKD transmitter (the key distributing unit 1a) and the QKD receiver (the key distributing unit 1b) share a cryptographic key using the quantum key distribution technology. Then, the key distributing unit 1a transmits that cryptographic key to the key storing unit 5a, and the key distributing unit 1b transmits that cryptographic key to the key storing unit 5b. The communicating unit 2a receives the cryptographic key from the key storing unit 5a. Moreover, the communicating unit 2b receives the cryptographic key from the key storing unit 5b. The communicating units 2a and 2b perform cryptographic communication using the cryptographic key. Herein, the cryptographic communication itself is identical to that performed in the exemplary configuration illustrated in FIG. 3.

Figure 5:
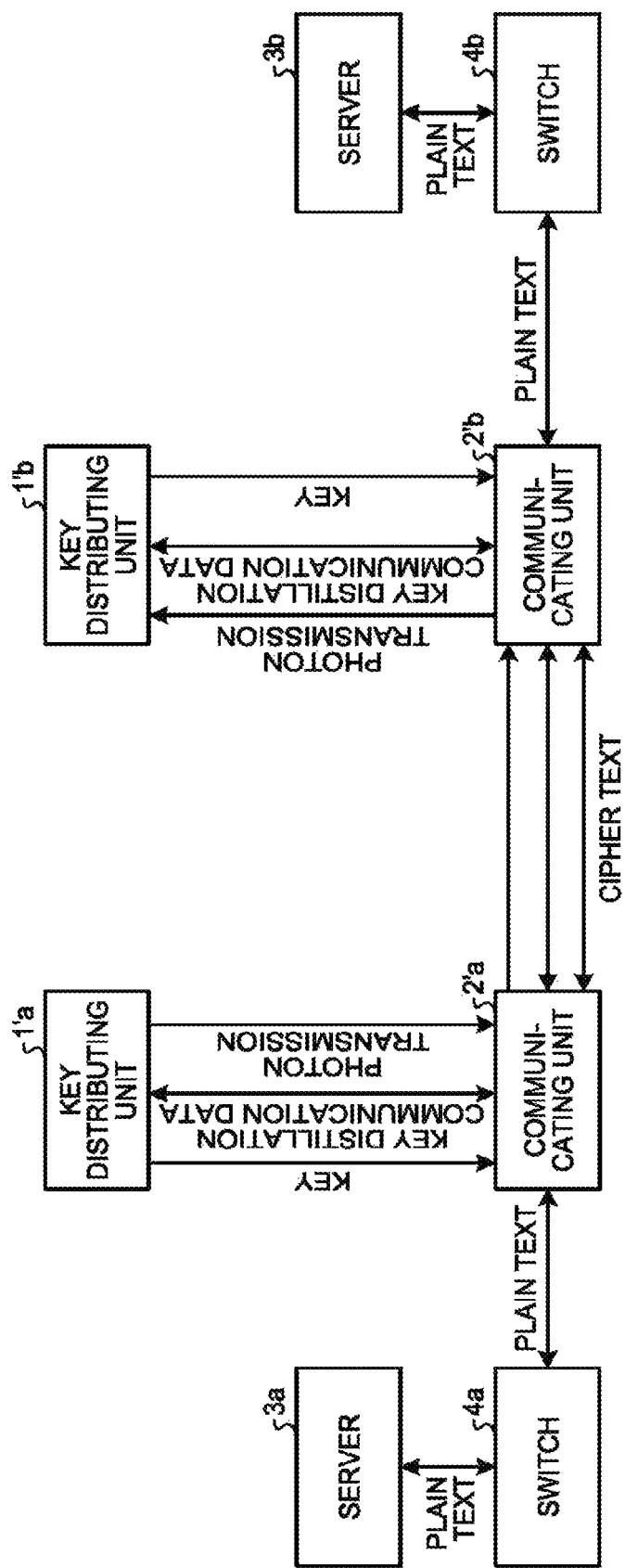
FIG. 5 is a diagram illustrating still another exemplary configuration of the QKD communication infrastructure system.

FIG. 5 is a diagram illustrating still another exemplary configuration of the QKD communication infrastructure system. As illustrated in FIG. 5, the QKD communication infrastructure system includes key distributing units 1'a and 1'b, communicating units 2'a and 2'b, the servers 3a and 3b, and the switches 4a and 4b. Herein, the difference from FIG. 3 is that two types of communication (photon transmission and key distillation control data) between the key distributing units 1'a and 1'b is performed via the communicating units 2.

As a result of such a configuration, the key distributing unit 1 no more needs to be directly connected to the key distributing units installed at other base locations, and is connected only to the communicating unit 2 installed at the same base location. In FIG. 2, it is illustrated that photon transmission as well as key distillation control data transmission is performed via the communicating units 2. However, alternatively, the configuration can be such that either photon transmission or key distillation control data can be performed via the communicating units 2.

As described above, in the case of using the QKD communication system as a cryptographic communication infrastructure, high communication security as well as a high degree of reliability becomes necessary. In that regard, in the embodiments described below, the degree of reliability is enhanced by configuring the QKD communication system to have a redundant configuration (a duplicate configuration).

Meanwhile, the key distributing unit 1 has the characteristic that the generation rate for generating cryptographic keys undergoes variation. For example, depending on the disturbances (such as changes in temperature, or vibrations) with respect to the communication fiber, sometimes there is a decline in the generation rate for generating cryptographic keys. Moreover, when a situation suspected to be wiretapping occurs with respect to the communication fiber, the cryptographic key generation rate of the key distributing unit 1 practically becomes equal to zero (temporarily comes to a stop). Even if the key distributing unit 1 continues the operations, if the generation rate (the generative capacity) for generating cryptographic keys undergoes a decline or becomes nil, it needs to be treated as a failure. Moreover, in the first place, in order for the key distributing unit 1 to generate a cryptographic key, transmission of photons via an optical fiber as well as communication of control data for key distillation needs to be performed. For that reason, the generative capacity for generating cryptographic keys and the degree of reliability of the key distributing unit 1 is also dependent on the degree of reliability of the communicating unit 2 that transfers key distillation control data. In the embodiments described below, a redundant configuration is achieved by taking into account such characteristics.

First Embodiment

Figure 6:
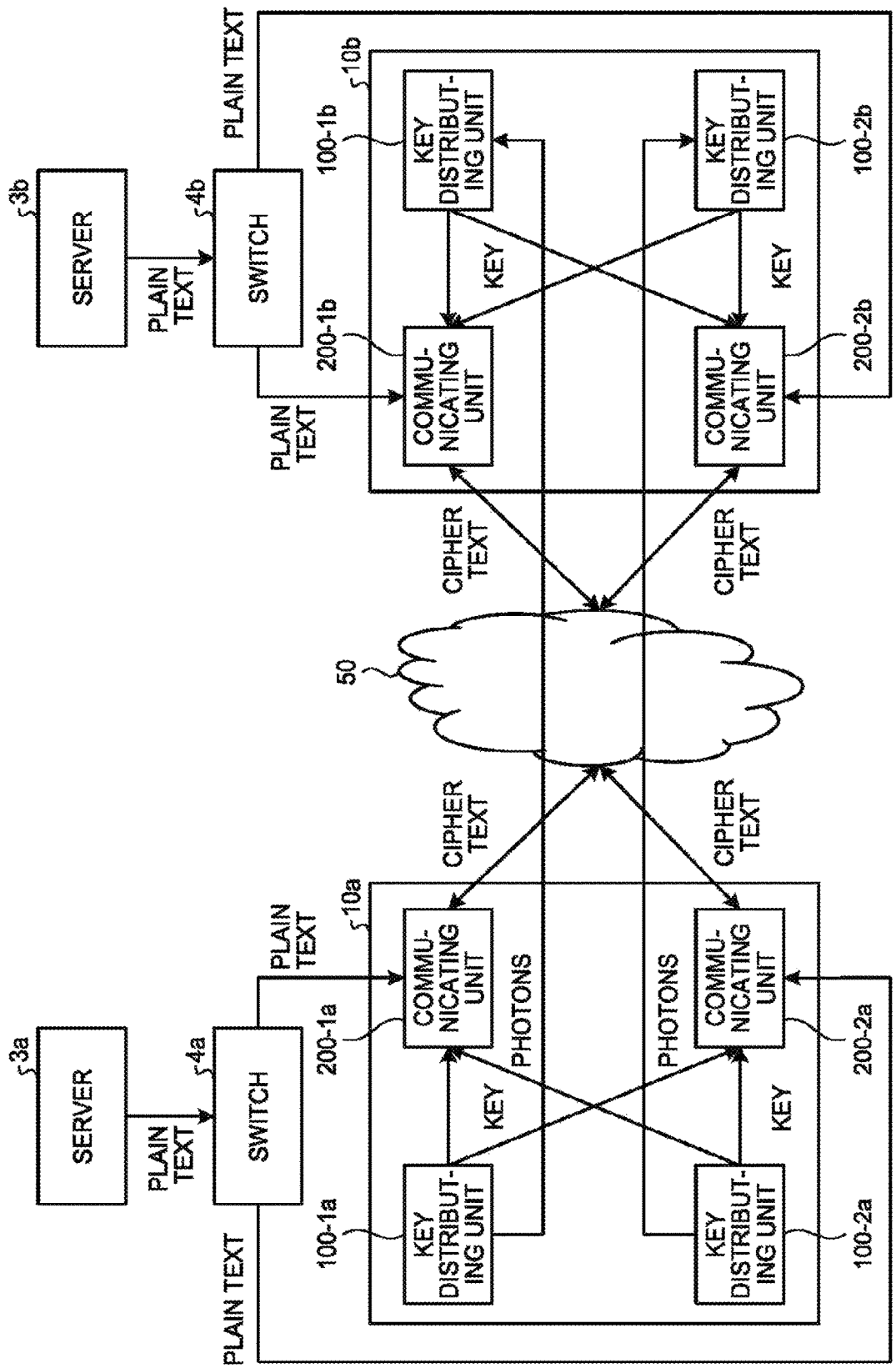
FIG. 6 is a diagram illustrating an exemplary configuration of a communication system according to a first embodiment.

FIG. 6 is a diagram illustrating an exemplary configuration of a communication system according to a first embodiment. As illustrated in FIG. 6, the communication system according to the first embodiment includes communication devices 10a and 10b, the servers 3a and 3b, the switches 4a and 4b, and a network 50. The communication device 10a, the server 3a, and the switch 4a are installed at the base location PA, for example. The communication device 10b, the server 3b, and the switch 4b are installed at the base location PB, for example. The network 50 is, for example, the Internet. However, the network 50 can have any network form.

The communication device 10a includes key distributing units 100-1a and 100-2a, and includes communicating units 200-1a and 200-2a. The key distributing units 100-1a and 100-2a have the functions equivalent to the key distributing unit 1a illustrated in FIG. 3. That is, the key distributing units 100-1a and 100-2a have the quantum key distribution function for sharing quantum keys with external key distributing units 100-1b and 100-2b (examples of an external distribution device). The communicating units 200-1a and 200-2a have the functions equivalent to the communicating unit 2a illustrated in FIG. 3. That is, the communicating units 200-1a and 200-2a have the function of communicating with external communicating units 200-1b and 200-2b (examples of an external communication device) using the shared quantum keys.

In an identical manner, the communication device 10b includes the key distributing units 100-1b and 100-2b, and includes the communicating units 200-1b and 200-2b. The key distributing units 100-1b and 100-2b have the functions equivalent to the key distributing unit 1b illustrated in FIG. 3. The communicating units 200-1b and 200-2b have the functions equivalent to the communicating unit 2b illustrated in FIG. 3.

In this way, in the QKD communication infrastructure system illustrated in FIG. 3, the communication system illustrated in FIG. 6 is equivalent to the configuration in which the key distributing unit 1 and the communicating unit 2 are made redundant (are duplicated). In the first embodiment, the cryptographic communication between the system installed at the base location PA and the system installed at the base location PB is implemented using a redundant configuration.

The key distributing unit 100-1a corresponds to a QKD transmitter, and the key distributing unit 100-1b corresponds to a QKD receiver. The key distributing units 100-1a and 100-1b generate cryptographic keys using the quantum key distribution technology. As illustrated in FIG. 6, the key distributing units 100-1a and 100-1b are directly connected to each other and perform photon transmission by direct-connection communication. Meanwhile, the communication of key distillation control data can be performed using direct-connection communication in an identical manner to photon transmission, or can be performed via the communicating units 200-1a and 200-2a as described later. The QKD system including the key distributing units 100-1a and 100-1b is sometimes referred to as a QKD system S1.

The key distributing unit 100-2a corresponds to a QKD transmitter, and the key distributing unit 100-2b corresponds to a QKD receiver. The key distributing units 100-2a and 100-2b generate cryptographic keys using the quantum key distribution technology. The operations performed by the key distributing units 100-2a and 100-2b are identical to the operations performed by the key distributing units 100-1a and 100-1b. The QKD system including the key distributing units 100-2a and 100-2b is sometimes referred to as a QKD system S2.

The QKD system S1 as well as the QKD system S2 is operated at all times. As a result of operating the two QKD systems in a concurrent manner, a redundancy securing function becomes available in which not only the system performance is put to maximum use but also preparation is done for a failure such as termination or malfunctioning of one of the QKD systems. Such a method of implementing a redundant configuration in which two QKD systems are operated in a concurrent manner is called A/A (active/active). Another method of implementing a redundant configuration is called A/S(active/standby). The A/S method is a redundant configuration method in which only one of the two QKD systems is operated and, when a failure occurs in the running QKD system, the other QKD system is operated for the first time. In the environment in which a dual QKD system is implemented, if one of the QKD systems is not operated in normal time, it cannot be said that the available resources are utilized in an effective manner. From that perspective, the A/A method is desirable. However, the A/S method can also be implemented.

The communicating units 200-1a and 200-2a together provide a communication infrastructure function at the base location PA. For example, the communicating units 200-1a and 200-2a enable cryptographic communication between the devices such as the server 3a installed at the base location PA and external devices (particularly, the server 1b installed at the base location PB).

Regarding the method of implementing a redundant configuration for the communicating units 200-1a and 200-2a, the A/A method and the A/S method are available. In the A/A method, the communicating units 200-1a and 200-2a are operated at all times. The plain text traffic from the server 3a and the switch 4a flows in a dispersed manner to the communicating units 200-1a and 200-2a, and the load is dispersed between the communicating units 200-1a and 200-2a. As a result, along with achieving redundancy, the transfer capacity or the cryptography processing capacity of the communication system gets optimized. On the other hand, in case there occurs a failure in the form of termination or malfunctioning of either the communicating unit 200-1a or the communicating unit 200-2a, only the communicating unit that has not terminated or is not malfunctioning is operated as the communication system.

In the A/S method, only one of the communicating units 200-1a and 200-2a (for example, only the communicating unit 200-1a) is operated in normal time. Thus, the traffic from the server 3a and the switch 4a is entirely processed by the communicating unit 200-1a. In case there occurs a failure in the form of termination or malfunctioning of the communicating unit 200-1a, the communicating unit 200-2a starts operations as the communication system on behalf of the communicating unit 200-1a.

The communicating units 200-1b and 200-2b provide a communication infrastructure function at the base location PB. For example, the communicating units 200-1b and 200-2b enable cryptographic communication between the devices such as the server 3b installed at the base location PB and external devices (particularly, the server 3a installed at the base location PA). The relevant details are identical to the communicating units 200-1a and 200-2a.

Given below is the explanation of a method for providing keys from the key distributing units 100-1a and 100-2a to the communicating units 200-1a and 200-2a, respectively. The following explanation is given for the base location PA. The identical operations are performed at the base location PB.

Firstly, consider the case in which the communicating units 200-1a and 200-2a are configured according to the A/A method. During normal operations, keys need to be provided to the communicating unit 200-1a as well as the communicating unit 200-2a. For that reason, as a general configuration, the key distributing unit 100-1a provides the generated keys to the communicating unit 200-1a, and the key distributing unit 100-2a provides the generated keys to the communicating unit 200-2a.

In case a failure occurs in one of the key distributing units (for example, the key distributing unit 100-1a), the key distributing unit having no failure (the key distributing unit 100-2a) needs to provide keys to the communicating unit 200-1a as well as the communicating unit 200-2a. For that reason, the key distributing unit 100-2a provides the generated keys to the communicating units 200-1a and 200-2a in a split manner. At that time, regarding which keys are to be provided to which communicating units, or regarding which keys are to be used in which communicating units, or regarding the ratio of allocation of the keys; key synchronization becomes necessary between the key distributing units and the communicating units.

In case a failure occurs in one of the communicating units (for example, the communicating unit 200-1a); then the keys need not be provided anymore to that communicating unit. For that reason, after a failure occurs in the communicating unit 200-1a, the key distributing unit 100-1a that was providing the keys to the communicating unit 200-1a during normal operations now provides the keys to the communicating unit 200-2a. At that time, regarding which keys to be provided to which communicating units, or regarding which keys are to be used in which communicating units; key synchronization becomes necessary between the key distributing units or the communicating units.

Consider the case in which the communicating units 200-1a and 200-2a are configured according to the A/S method. Assume that the communicating unit 200-1a is active, and the communicating unit 200-2a is in the standby mode. During normal operations, it serves the purpose if the key distributing units provide the keys to the communicating unit 200-1a. Thus, the key distributing units 100-1a and 100-2a provide the keys to the communicating unit 200-2a.

In case a failure occurs in one of the key distributing units (for example, the key distributing units 100-1a); then the number of keys provided to the communicating unit 200-1a decreases by half. However, if the necessary key synchronization is already performed, then no particular measures need to be taken. In case a failure occurs in the active communicating unit (the communicating unit 200-1a), the communicating unit in the standby mode (the communicating unit 200-2a) becomes active. At that time, the key di outing unit 100-1a, which was providing the keys to the communicating unit 200-1a, and the communicating unit 200-2a make changes so that the keys are henceforth provided to the communicating unit 200-2a.

Meanwhile, the storage function for storing the generated keys as well as the synchronization function for synchronizing the keys is assumed to be provided (as may be necessary) in either the key distributing units or the communicating units. Moreover, either the key distributing units can transmit the keys to the communicating units, or the communicating units can issue a request for obtaining the keys to the key distributing units.

The key distributing units 100-1a, 100-1b, 100-2a, and 100-2b have an identical configuration. Hence, when those key distributing units need not be distinguished from each other, they are sometimes simply referred to as the key distributing unit 100. In an identical manner, the communicating units 200-1a, 200-1b, 200-2a, and 200-2b have an identical configuration. Hence, when those communicating units need not be distinguished from each other, they are sometimes simply referred to as the communicating unit 200. Moreover, when the communication devices 10a and 10b need not be distinguished from each other, they are sometimes simply referred to as the communication device 10.

Meanwhile, the constituent elements of the communication device 10 (i.e., the key distributing unit 100 and the communicating unit 200) need not be installed in the physically same device, and some or all of them can be installed in physically different devices.

Figure 7:
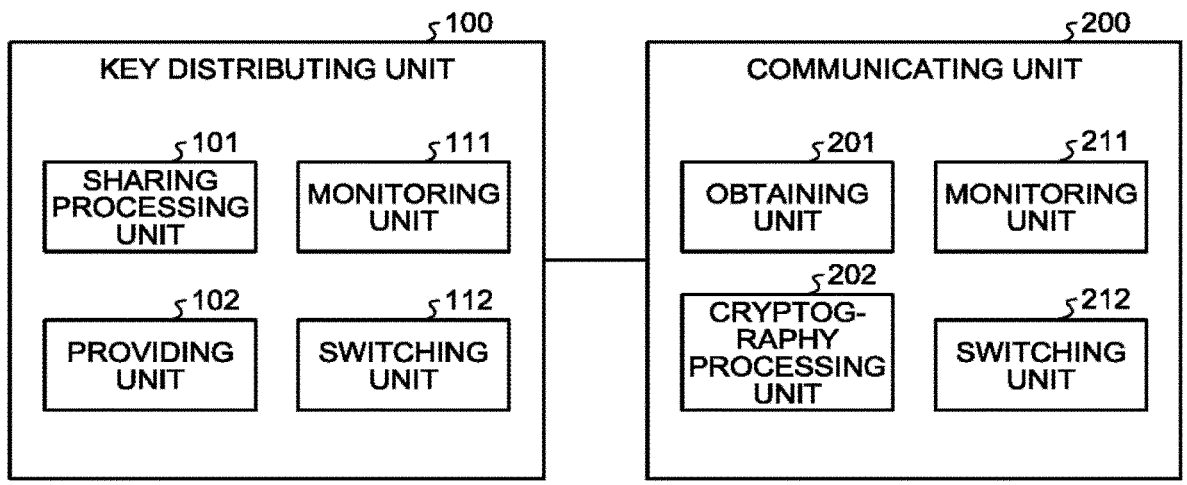
FIG. 7 is a diagram illustrating an exemplary functional configuration of a communication device according to the first embodiment.

Given below is the explanation of the detailed functional configuration of the key distributing unit 100 and the communicating unit 200 according to the first embodiment. FIG. 7 is a diagram illustrating an exemplary functional configuration of the communication device 10 according to the first embodiment. As illustrated in FIG. 7, the key distributing unit 100 includes a sharing processing unit 101, a providing unit 102, a monitoring unit 111, and a switching unit 112.

The sharing processing unit 101 shares keys (cryptographic keys) with other communication devices 10 using the quantum key distribution technology. The providing unit 102 provides the shared keys to the communicating unit 200.

The monitoring unit 111 monitors the operational status of the communication device 10. The operational status represents at least one of the status of transmission and reception of photons in the quantum key distribution function, and the status of generation of quantum keys.

The switching unit 112 switches between the control targets according to the monitored operational status. The control targets include the key distributing unit 100 and the communicating unit 200. For example, according to the operational status, the switching unit 112 switches the running (active) control target (a first control target) to another control target (a second control target). For example, when the key distributing unit 100 is the control target and when a failure is determined to have occurred according to the operational status, the switching unit 112 switches the active key distributing unit 100 (for example, the key distributing unit 100-1) to the key distributing unit 100 in the standby mode (for example, the key distributing unit 100-2).

The following explanation is given about the communicating unit 200. As illustrated in FIG. 7, the communicating unit 200 includes an obtaining unit 201, a cryptography processing unit 202, a monitoring unit 211, and a switching unit 212.

The obtaining unit 201 obtains a key from the key distributing unit 100. The cryptography processing unit 202 performs encryption and decryption of data using the obtained key.

The monitoring unit 211 monitors the operational status of the communication device 10. The operational status is, for example, the quantum key obtaining status of the obtaining unit 201.

The switching unit 212 switches between the control targets according to the monitored operational status. The control targets include the key distributing unit 100 and the communicating unit 200.

In FIG. 7 is illustrated an example in which the key distributing unit 100 as well as the communicating unit 200 includes the monitoring unit and the switching unit. Alternatively, the configuration can be such that, depending on whether the key distributing unit 100 is the control target or the communicating unit 200 is the control target, the monitoring unit and the switching unit can be included in only either the key distributing unit 100 or the communicating unit 200. Regarding the operations for each combination of the monitoring-and-switching subject and the control target, the details are given later.

The constituent elements of the key distributing unit 100 and the communicating unit 200 can be implemented by making one or more processors such as a central processing unit (CPU) to execute computer programs, that is, can be implemented using software; or can be implemented using hardware such as one or more integrated circuits (IC); or can be implemented using a combination of software and hardware.

Figure 8:
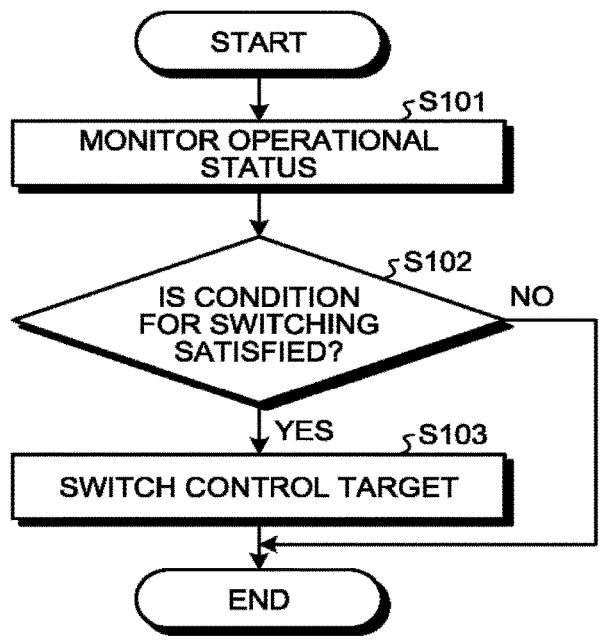
FIG. 8 is a flowchart for explaining a switching operation performed according to the first embodiment.

Explained below with reference to FIG. 8 is a switching operation performed in the communication device 10 that is configured in the abovementioned manner according to the first embodiment. FIG. 8 is a flowchart for explaining a switching operation performed according to the first embodiment.

The following explanation is given for an example in which the monitoring unit 111 of the key distributing unit 100 monitors the operational status and the switching unit 112 of the key distributing unit 100 switches between the control targets. In the case in which the monitoring unit 211 of the communicating unit 200 monitors the operational status and the switching unit 212 of the communicating unit 200 switches between the control targets, the same sequence of operations is applicable.

Firstly, the monitoring unit 111 monitors the operational status of the communication device 10 (Step S101). Then, the monitoring unit 111 determines whether or not the operational status satisfies a condition for switching (Step S102). A condition for switching is, for example, a condition indicating that the communication device 10 is not operating normally. The following conditions are treated as the conditions for switching.

The number of generated cryptographic keys is smaller than a threshold value.

The photon transmission or the key distillation control data communication performed by the key distributing unit 100 has failed.

If the operational status satisfies a condition for switching (Yes at Step S102), then the switching unit 112 switches the control target (Step S103). However, if the operational status does not satisfy a condition for switching (No at Step S102), the switching operation is ended.

The conditions for witching explained above are only exemplary, and are not the only possible conditions. Alternatively, for example, when the monitoring unit 211 of the communicating unit 200 monitors the operational status, the following conditions for switching can be used.

The keys cannot be obtained from the key distributing unit 100.

The number of keys obtainable from the key transmitting unit 100 is smaller than a threshold value.

Given below is the explanation of a specific example of redundancy control. It is possible to think of following four patterns as the patterns of redundancy control.

Pattern A: the communicating unit 200 (the monitoring unit 211) performs the monitoring, and redundancy of the key distributing unit 100 is achieved.

Pattern B: the key distributing unit 100 (the monitoring unit 111) performs the monitoring, and redundancy of the key distributing unit 100 is achieved.

Pattern C: the communicating unit 200 (the monitoring unit 211) performs the monitoring, and redundancy of the communicating unit 200 is achieved.

Pattern D: the key distributing unit 100 (the monitoring unit 111) performs the monitoring, and redundancy of the communicating unit 200 is achieved.

The explanation is given below in order.

Pattern A

Figure 9:
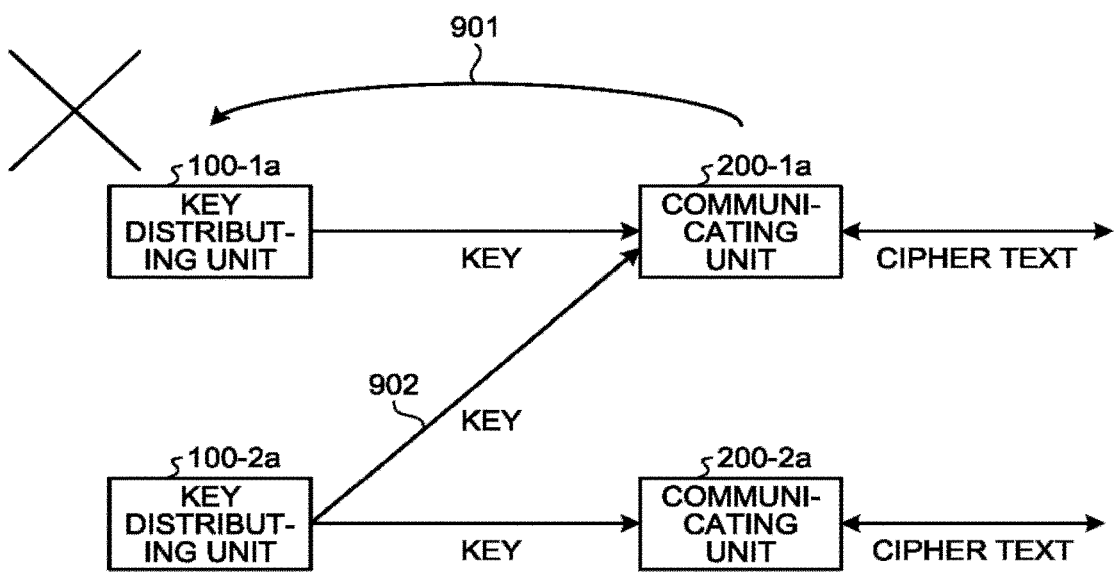
FIG. 9 is a diagram for explaining a redundancy control method of a pattern A.

FIG. 9 is a diagram for explaining a redundancy control method of the pattern A. Herein, the pattern A is effective only when the communicating unit 200 is configured according to the A/A method.

(A1) The communicating unit 200-1a (the monitoring unit 211) periodically monitors the key distributing unit 100-1a (an arrow 901). For example, the communicating unit 200-1a monitors that the key distributing unit 100-1a is running normally or that the key distributing unit 100-1a is not in a failure state. Whether or not the key distributing unit 100-1a is running normally is determined depending on, for example, "whether keys can be obtained from the key distributing unit 100-1a", "whether the number of keys obtainable from the key distributing unit 100-1a is equal to or greater than a threshold value", and "whether the photon transmission or the key distillation control data communication performed by the key distributing unit 100-1a successful".

(A2) If a failure is detected in the key distributing unit 100-1a, the communicating unit 200-1a (the switching unit 212) does not obtain keys from the key distributing unit 100-1a and switches the key obtaining destination so as to obtain the keys from the key distributing unit 100-2a (an arrow 902). Hence, the key distributing unit 100-2a has to provide the keys to the communicating unit 200-2a as well as the communicating unit 200-1a. For that reason, the key distributing unit 100-2a takes into account the processing traffic volume and the priority with the communicating units 200-2a and 200-1a, and accordingly decides on the number of keys to be provided to the two communicating units.

(A2-1) The reason for the occurrence of a failure in the key distributing unit 100-1a can be a failure in the key distributing unit 100-1a itself or can be a failure in the key distributing unit 100-1b (the receiver) installed at the base location PB. That is because the generation of keys using quantum key distribution requires that the transmitter as well as the receiver is operating normally. Thus, regarding the receiver to be used at the time of quantum key distribution performed by the key distributing unit 100-1a (the transmitter), the switching unit 212 can switch the receiver from the key distributing unit 100-1b to another key distributing unit (for example, the key distributing unit 100-2b); so that quantum key distribution can be separately performed. At (A2) explained above, if the reason for a failure in the key distributing unit 100-1a lies in the key distributing unit 100-1b, the switching of the key distributing unit (the receiver) may result in the revival of the key distributing unit 100-1a to perform normal operations.

(A3) Accompanying a change in the key provision destination and the key obtaining destination, key synchronization becomes necessary. Thus, the key distributing unit 100-2a, the communicating unit 200-1a, or the communicating unit 200-2a performs the necessary key synchronization with the key distributing unit 100 or the communicating unit 200 installed at the base location PB, for example.

Meanwhile, in (A1) (A3) is illustrated a sequence in which the communicating unit 200-1a monitors the key distributing unit 100-1a. At the same time, a sequence in which the communicating unit 200-2a monitors the key distributing unit 100-2a can also be implemented.

Pattern B

Figure 10:
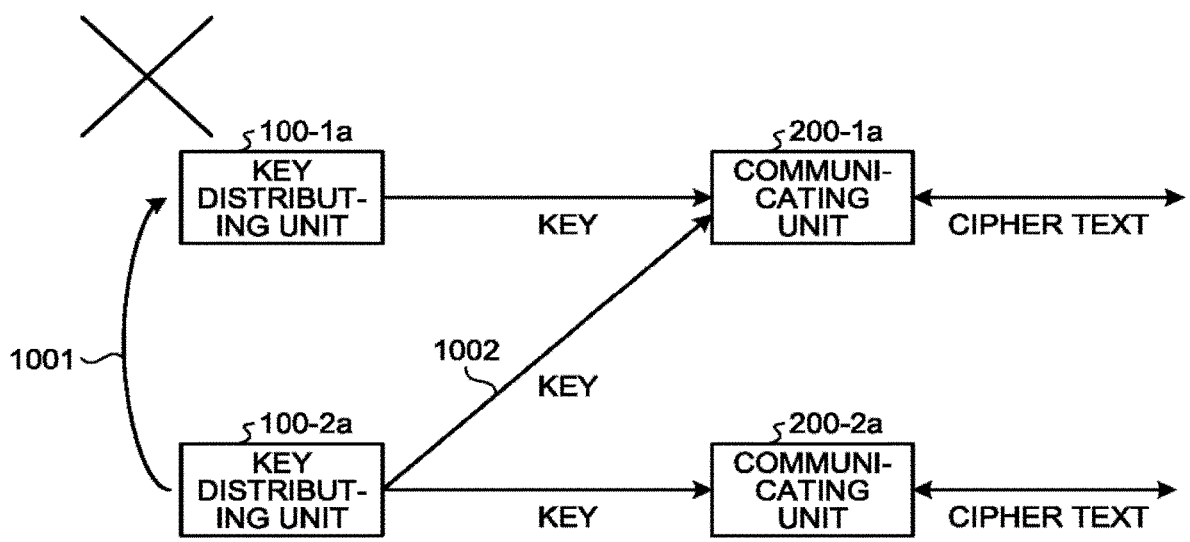
FIG. 10 is a diagram for explaining a redundancy control method of a pattern B.

FIG. 10 is a diagram for explaining a redundancy control method of the pattern B. Herein, the pattern B is effective only when the communication device 10 is configured according to the A/A method.

(B1) The key distributing unit 100-2a (the monitoring unit 111) periodically monitors the key distributing unit 100-1a (an arrow 1001). For example, the key distributing unit 100-2a monitors that the key distributing unit 100-1a is running normally or that the key distributing unit 100-1a is not in a failure state. Whether or not the key distributing unit 100-1a is running normally is determined depending on, for example, "whether the key distributing unit 100-1a is generating keys", "whether the number of keys generated by the key distributing unit 100-1a is equal to or greater than a threshold value", and "whether the photon transmission or the key distillation control data communication performed by the key distributing unit 100-1a is successful".

(B2) If a failure is detected in the key distributing unit 100-1a, the key distributing unit 100-2a (the switching unit 112) switches the key provision destination so as to provide the keys to the communicating unit 200-1a too on behalf of the key distributing unit 100-1a (an arrow 1002). Hence, the key distributing unit 100-2a has to provide the keys to the communicating unit 200-2a as well as the communicating unit 200-1a. For that reason, the key distributing unit 100-2a takes into account the processing traffic volume and the priority with the communicating units 200-2a and 200-1a, and accordingly decides on the number of keys to be provided to the two communicating units.

(B2-1) The reason for the occurrence of a failure in the key distributing unit 100-1a can be a failure in the key distributing unit 100-1a itself or can be a failure in the key distributing unit 100-1b (the receiver) installed at the base location PB. That is because the generation of keys using quantum key distribution requires that the transmitter as well as the receiver is operating normally. Thus, regarding the receiver to be used at the time of quantum key distribution performed by the key distributing unit 100-1a (the transmitter), the switching unit 112 can switch the receiver from the key distributing unit 100-1b to another key distributing unit (for example, the key distributing unit 100-2b); so that quantum key distribution can be separately performed. At (B2) explained above, if the reason for a failure in the key distributing unit 100-1a lies in the key distributing unit 100-1b, the switching of the key distributing unit (the receiver) may result in the revival of the key distributing unit 100-1a to perform normal operations.

(B3) Accompanying a change in the key provision destination and the key obtaining destination, key synchronization becomes necessary. Thus, the key distributing unit 100-2a, the communicating unit 200-1a, or the communicating unit 200-2a performs the necessary key synchronization with the key distributing unit 100 or the communicating unit 200 installed at the base location PB, for example.

Meanwhile, in (B1) to (B3) is illustrated a sequence in which the key distributing unit 100-2a monitors the key distributing unit 100-1a. At the same time, a sequence in which the key distributing unit 100-1a monitors the key distributing unit 100-2a can also be implemented.

Moreover, in the pattern B, the monitoring side as well as the redundancy achieving side includes the key distributing unit 100. Hence, using an existing communication device, a redundant configuration can be achieved just by adding the key distributing unit 100 according to the first embodiment (and a storage device depending on the situation).

Pattern C

Figure 11:
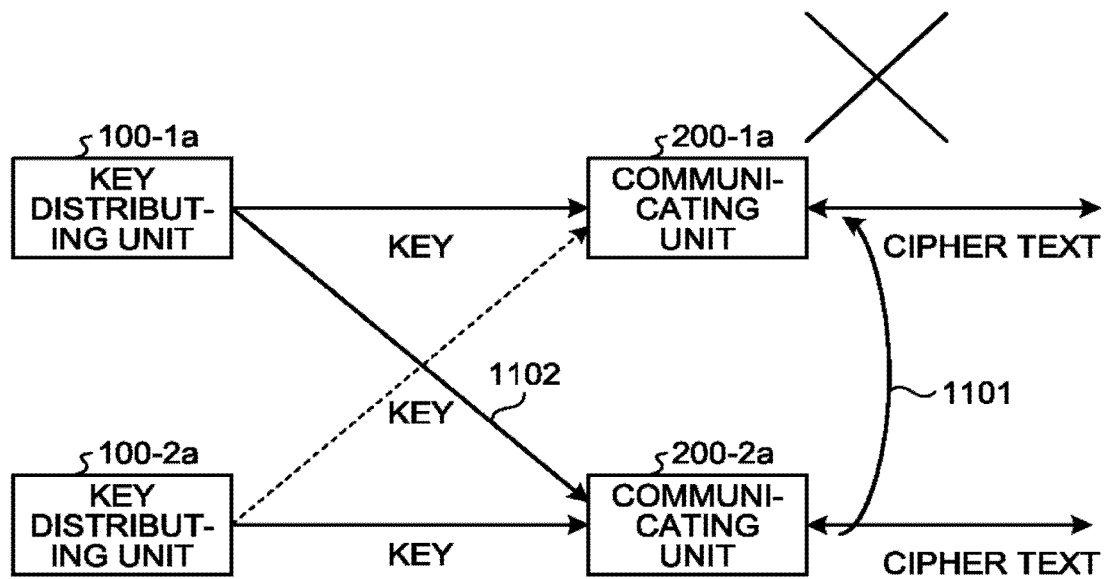
FIG. 11 is a diagram for explaining a redundancy control method of a pattern C.

FIG. 11 is a diagram for explaining a redundancy control method of the pattern C. Herein, the pattern C is effective regardless of whether the communication device 10 is configured according to the A/A method or according to the A/S method.

(C1) The communicating unit 200-2a (the monitoring unit 211) periodically monitors the communicating unit 200-1a (an arrow 1101). For example, the communicating unit 200-2a monitors that the communicating unit 200-1a is running normally or that the communicating unit 200-1a is not in a failure state. Whether or not the communicating unit 200-1a is running normally is determined depending on, for example, "whether the communicating unit 200-1a is obtaining keys", "whether the number of keys obtained by the communicating unit 200-1a is equal to or greater than a threshold value", and "whether the photon transmission or the key distillation control data communication performed by the key distributing unit 100-1a is successful".

(C2) If a failure is detected in the communicating unit 200-1a, then it is the communicating unit 200-2a that transfers all of the communication traffic on behalf of the communicating unit 200-1a. In the A/A method, the communicating unit 200-2a operates as the main communicating unit on behalf of the communicating unit 200-1a. In the A/S method, the communicating unit 200-2a becomes active on behalf of the communicating unit 200-1a. Regarding the provision of keys, in the A/A method, the key distributing unit 100-1a provides the keys to the communicating unit 200-1a, and the key distributing unit 100-2a provides the keys to the communicating unit 200-2a. If a failure occurs in the communicating unit 200-1a, the key distributing unit 100-1a provides the keys not to the communicating unit 200-1a but to the communicating unit 200-2a. In the A/S method, the key distributing units 100-1a and 100-2a provide the keys to the communicating unit 200-1a. If a failure occurs in the communicating unit 200-1a, the key distributing units 100-1a and 100-2a provide the keys to the communicating unit 200-2a. As a result, regardless of whether the A/A method is implemented or the A/S method is implemented, updating is so done that the communicating unit 200-2a obtains all keys from the key distributing units 100-1a and 100-2a (an arrow 1102).

(C3) Accompanying a change in the key provision destination and the key obtaining destination, key synchronization becomes necessary. Thus, the key distributing unit 100-1a, the communicating unit 200-1a, or the communicating unit 200-2a performs the necessary key synchronization with the key distributing unit 100 or the communicating unit 200 installed at the base location PB, for example.

Meanwhile, in (C1) to (C3) is illustrated a sequence in which the communicating unit 200-2a monitors the communicating unit 200-1a. At the same time, a sequence in which the communicating unit 200-1a monitors the communicating unit 200-2a can also be implemented.

Pattern D

Figure 12:
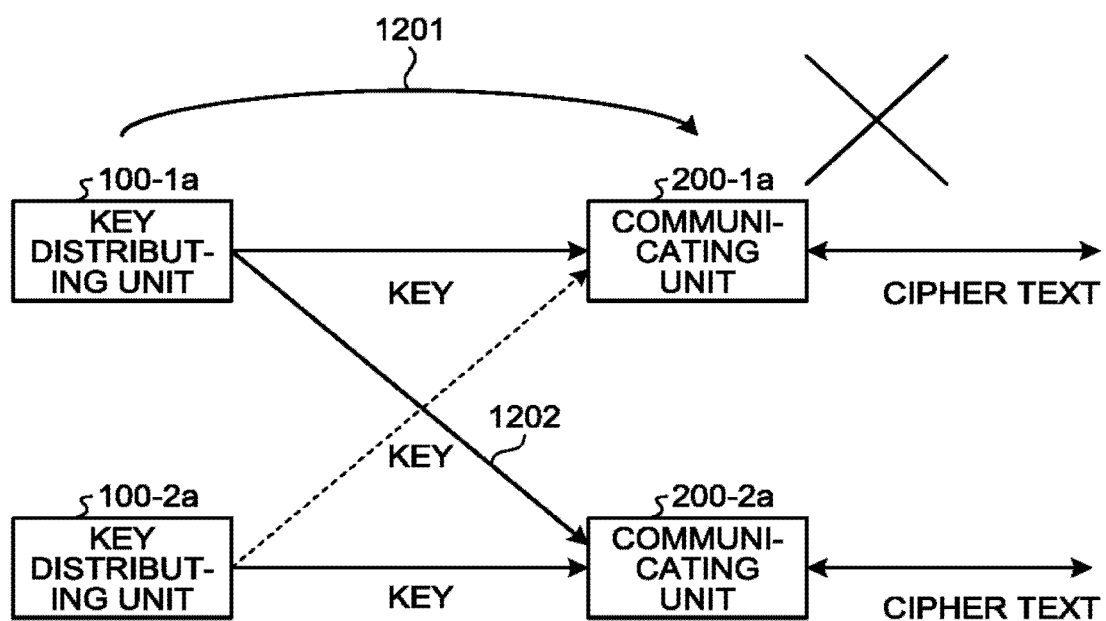
FIG. 12 is a diagram for explaining a redundancy control method of a pattern D.

FIG. 12 is a diagram for explaining a redundancy control method of pattern D. Herein, the pattern D is effective regardless of whether the communication device 10 is configured according to the A/A method or according to the A/S method.

(D1) The key distributing unit 100-1a periodically monitors the communicating unit 200-1a (an arrow 1201). For example, the key distributing unit 100-1a monitors that the communicating unit 200-1a is running normally or that the communicating unit 200-1a is not in a failure state. Whether or not the communicating unit 200-1a is running normally is determined depending on, for example, "whether the communicating unit 200-1a is obtaining keys" and "whether the number of keys obtained by the communicating unit 200-1a is equal to or greater than a threshold value".

(D2) If a failure is detected in the communicating unit 200-1a, then it is the communicating unit 200-2a that transfers all of the communication traffic on behalf of the communicating unit 200-1a. In the A/A method, the communicating unit 200-2a operates as the main communicating unit on behalf of the communicating unit 200-1a. In the A/S method, the communicating unit 200-2a becomes active on behalf of the communicating unit 200-1a. Regarding the provision of keys, in the A/A method, the key distributing unit 100-1a provides the keys to the communicating unit 200-1a, and the key distributing unit 100-2a provides the keys to the communicating unit 200-2a. If a failure occurs in the communicating unit 200-1a, the key distributing unit 100-1a provides the keys not to the communicating unit 200-1a but to the communicating unit 200-2a. In the A/S method, the key distributing units 100-1a and 100-2a provide the keys to the communicating unit 200-1a. If a failure occurs in the communicating unit 200-1a, the key distributing units 100-1a and 100-2a provide the keys to the communicating unit 200-2a. As a result, regardless of whether the A/A method is implemented or the A/S method is implemented, updating is so done that the communicating unit 200-2a obtains all keys from the key distributing units 100-1a and 100-2a (an arrow 1202).

(D3) Accompanying a change in the key provision destination and the key obtaining destination, key synchronization becomes necessary. Thus, the key distributing unit 100-1a, the communicating unit 200-1a, or the communicating unit 200-2a performs the necessary key synchronization with the key distributing unit 100 or the communicating unit 200 installed at the base location PB, for example.

Meanwhile, in (D1) to (D3) is illustrated a sequence in which the key distributing unit 100-1a monitors the communicating unit 200-1a. At the same time, a sequence in which the key distributing unit 100-2a monitors the communicating unit 200-2a can also be implemented.

In the first embodiment, a redundant configuration is achieved because the key distributing unit 100 and the communicating unit 200 perform mutual monitoring. Regarding the protocol for monitoring and the method for utilization of the communication devices 10, any technology can be implemented. For example, the virtual router redundancy protocol (VRAP) is known as the protocol by which the communication devices 10 perform mutual monitoring and achieve a redundant configuration. Apart from that, as a technology for operating a device such as a server by duplicating it, technologies such as Internet protocol (IP) alias and Domain Name System (DNS) round robin are known. In the first embodiment, as a result of using these technologies and protocols, the functions described above can be implemented.

In this way, in the communication device according to the first embodiment, as a result of achieving a redundant configuration (a duplicate configuration), it becomes possible to enhance the degree of reliability.

Second Embodiment

A communication device according to a second embodiment achieves a redundant configuration in a communication system in which two types of communication (photon transmission and key distillation control data communication) are performed via communicating units.

Figure 13:
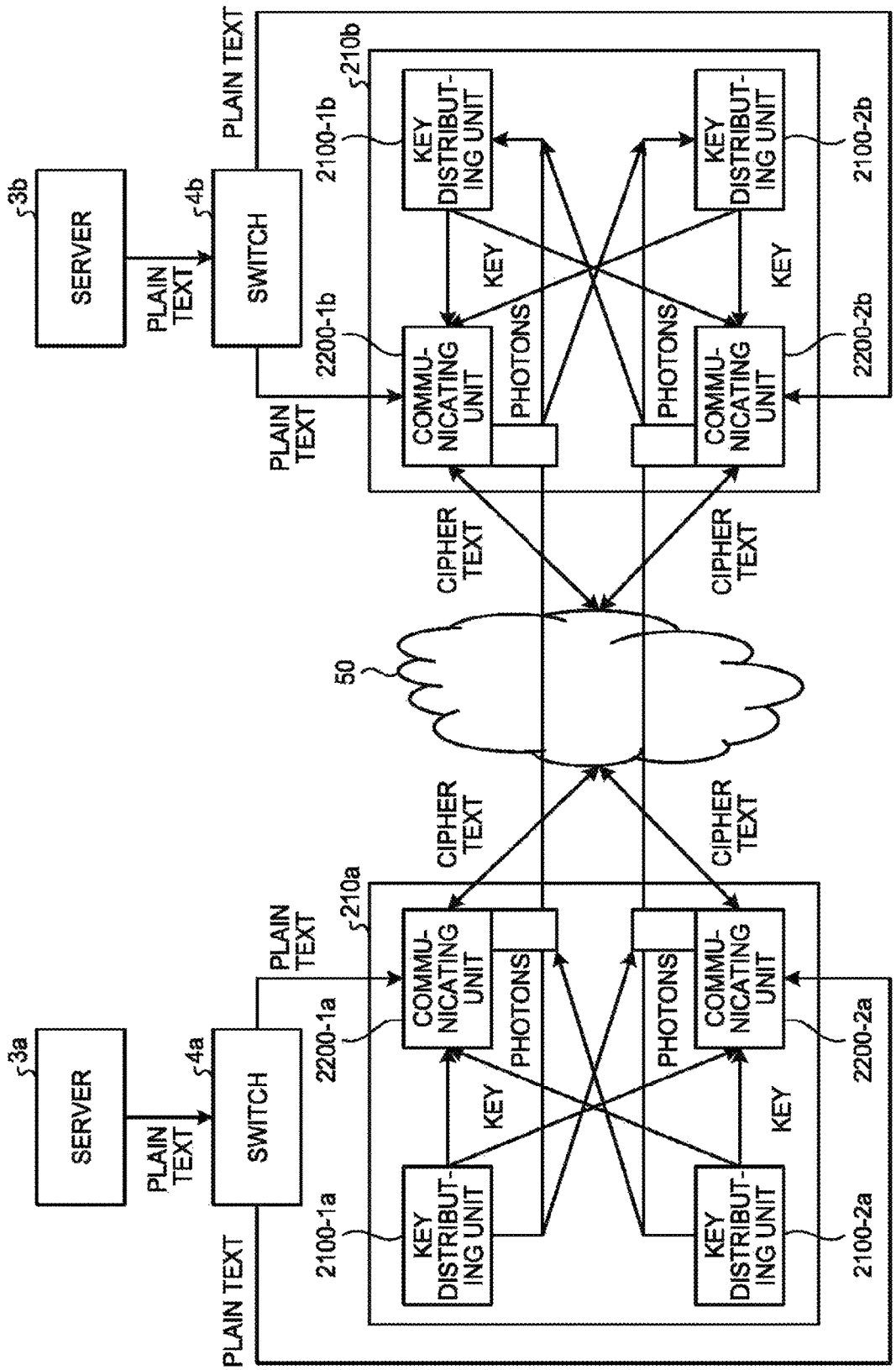
FIG. 13 is a diagram illustrating an exemplary configuration of a communication system according to a second embodiment.

FIG. 13 is a diagram illustrating an exemplary configuration of a communication system according to the second embodiment. As illustrated in FIG. 13, the communication system according to the second embodiment includes communication devices 210a and 210b, the servers 3a and 3b, the switches 4a and 4b, and the network 50. The communication device 210a, the server 3a, and the switch 4a are installed at the base location PA, for example. The communication device 210b, the server 3b, and the switch 4b are installed at the base location PB, for example. The configuration identical to the first embodiment is referred to by the same reference numerals, and the explanation is not repeated.

The communication device 210a includes key distributing units 2100-1a and 2100-2a, and includes communicating units 2200-1a and 2200-2a. The key distributing units 100-1a and 2100-2a have the functions equivalent to the key distributing unit 1'a illustrated in FIG. 5. That is, the key distributing units 2100-1a and 2100-2a have the quantum key distribution function for sharing quantum keys with external key distributing units 2100-1b and 2100-2b (examples of an external distribution device). The communicating units 2200-1a and 2200-2a have the functions equivalent to the communicating unit 2'a illustrated in FIG. 5. That is, the communicating units 2200-1a and 2200-2a have the function of communicating with external communicating units 2200-1b and 2200-2b (examples of an external communication device) using the shared quantum keys.

In an identical manner, the communication device 210b includes the key distributing units 2100-1b and 2100-2b, and includes the communicating units 2200-1b and 2200-2b. The key distributing units 2100-1b and 2100-2b have the functions equivalent to the key distributing unit 1'b illustrated in FIG. 5. The communicating units 2200-1b and 2200-2b have the functions equivalent to the communicating unit 2'b illustrated in FIG. 5.

In this way, in the QKD communication infrastructure system illustrated in FIG. 5, the communication system illustrated in FIG. 13 is equivalent to the configuration in which the key distributing unit 1' and the communicating unit 2' are made redundant (are duplicated). In the second embodiment, the cryptographic communication between the system installed at the base location PA and the system installed at the base location PB is implemented using a redundant configuration.

The second embodiment differs from the first embodiment in the way that some of the traffic of the key distributing unit 2100 goes through the communicating unit 2200. That is, the communicating unit 2200 according to the second embodiment has a relaying function for relaying the information (photons and key distillation control data) used in the quantum key distribution function. The specific explanation of the differences is as follows.

In order to configure a QKD system that performs quantum key distribution between the key distributing units 2100-1a and 2100-1b, it is necessary to have a communication channel between the key distributing units 2100-1a and 2100-1b for performing photon transmission as well as key distillation control data communication. In the configuration illustrated in FIG. 13, at least one of photon transmission and key distillation control data communication is performed via the communicating unit 2200.

More particularly, at the time of performing photon transmission or key distillation control data communication between the key distributing unit 2100-1a installed at the base location PA and the key distributing unit 2100-1b installed at the base location PB, the communication and the transmission is performed via one of the paths described below.

A path passing through the communicating unit 2200-1a installed at the base location PA and the communicating unit 2200-1b installed at the base location PB A path passing through the communicating unit 2200-1a installed at the base location PA and the communicating unit 2200-2b installed at the base location PB A path passing through the communicating unit 2200-2a installed at the base location PA and the communicating unit 2200-1b installed at the base location PB A path passing through the communicating unit 2200-2a installed at the base location PA and the communicating unit 2200-2b installed at the base location PB The explanation given above implies the following.

Assuming that the photon transmission from a particular key distributing unit 2100 goes through a particular communicating unit 2200; if a failure occurs in that communicating unit 2200, then the photon transmission ends in failure. For that reason, the key generation in that key distributing unit 2100 ends in failure, and keys can no more be generated.

Assuming that the key distillation control data communication from a particular key distributing unit 2100 goes through a particular communicating unit 2200; if a failure occurs in that communicating unit 2200, then the photon transmission ends in failure. For that reason, the key generation in that key distributing unit 2100 ends in failure, and keys can no more be generated.

In the following explanation, photon transmission and key distillation control data communication is collectively referred to as key generation traffic. In a basic configuration, the key generation traffic between the key distributing units 2100-1a and 2100-1b is transmitted and received via the communicating units 2200-1a and 2200-1b. Moreover, the key generation traffic between the key distributing units 2100-2a and 2100-2b is transmitted and received via the communicating units 2200-2a and 2200-2b.

If a failure occurs in the communicating unit 2200-1a or the communicating unit 2200-1b, the key generation traffic between the key distributing units 2100-1a and 2100-1b cannot be passed through in that situation. Thus, the communication path for the key generation traffic is changed to one of the following paths.

A path passing through the communicating units 2200-2a and 2200-2b.

A path passing through the communicating units 2200-1a and 2200-2b.

A path passing through the communicating units 2200-2a and 2200-1b.

If a failure occurs in the communicating unit 2200-2a or the communicating unit 2200-2b, the key generation traffic between the key distributing units 2100-2a and 2100-2b cannot be passed through in that situation. Thus, the communication path for the key generation traffic is changed to one of the following paths.

A path passing through the communicating units 2200-1a and 2200-1b.

A path passing through the communicating units 2200-2a and 2200-1b.

A path passing through the communicating units 2200-1a and 2200-2b.

Other than the explanation given herein, the remaining functions are identical to the explanation given with reference to FIG. 6 according to the first embodiment.

Figure 14:
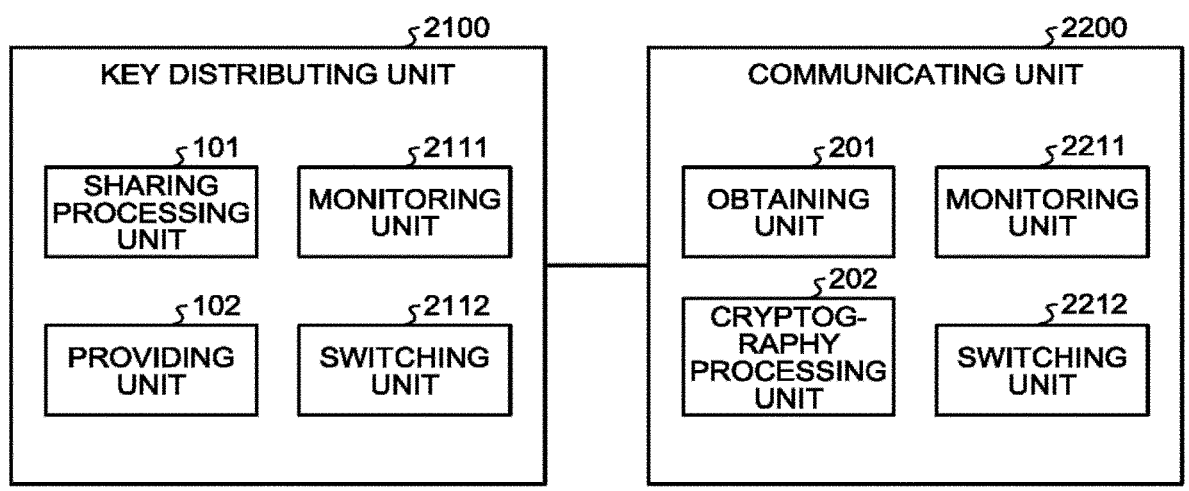
FIG. 14 is a diagram illustrating an exemplary functional configuration of a communication device according to the second embodiment.

Given below is the explanation of the detailed functional configuration of the key distributing unit 2100 and the communicating unit 2200 according to the second embodiment. FIG. 14 is a diagram illustrating an exemplary functional configuration of the communication device 210 according to the second embodiment. As illustrated in FIG. 14, the key distributing unit 2100 includes the sharing processing unit 101, the providing unit 102, a monitoring unit 2111, and a switching unit 2112. Moreover, the communicating unit 2200 includes the obtaining unit 201, the cryptography processing unit 202, a monitoring unit 2211, and a switching unit 2212.

In the second embodiment, the monitoring units (the monitoring units 2111 and 2211) and the switching units (the switching units 2112 and 2212) have different functions as compared to the functions in the first embodiment. The remaining configuration and functions are identical to FIG. 7 that is a block diagram of the communication device 10 according to the first embodiment. Hence, the same reference numerals are used, and the explanation is not repeated. Moreover, the flow of the switching operation according to the second embodiment is identical to the flow illustrated in FIG. 8 according to the first embodiment. Hence, that explanation is not repeated.

Given below are the details about the functions of the monitoring units and the switching units according to the second embodiment. In second embodiment too, in an identical manner to the first embodiment, it is possible to think of following four patterns as the patterns of redundancy control.

Pattern A: the communicating unit 2200 (the monitoring unit 2211) performs the monitoring, and redundancy of the key distributing unit 2100 is achieved.

Pattern B: the key distributing unit 2100 (the monitoring unit 2111) performs the monitoring, and redundancy of the key distributing unit 2100 is achieved.

Pattern C: the communicating unit 2200 (the monitoring unit 2211) performs the monitoring, and redundancy of the communicating unit 2200 is achieved.

Pattern D: the key distributing unit 2100 (the monitoring unit 2111) performs the monitoring, and redundancy of the communicating unit 2200 is achieved.

In the second embodiment, there are additional variations in the details explained in the first embodiment. The explanation is given below in order.

Pattern A

Figure 15:
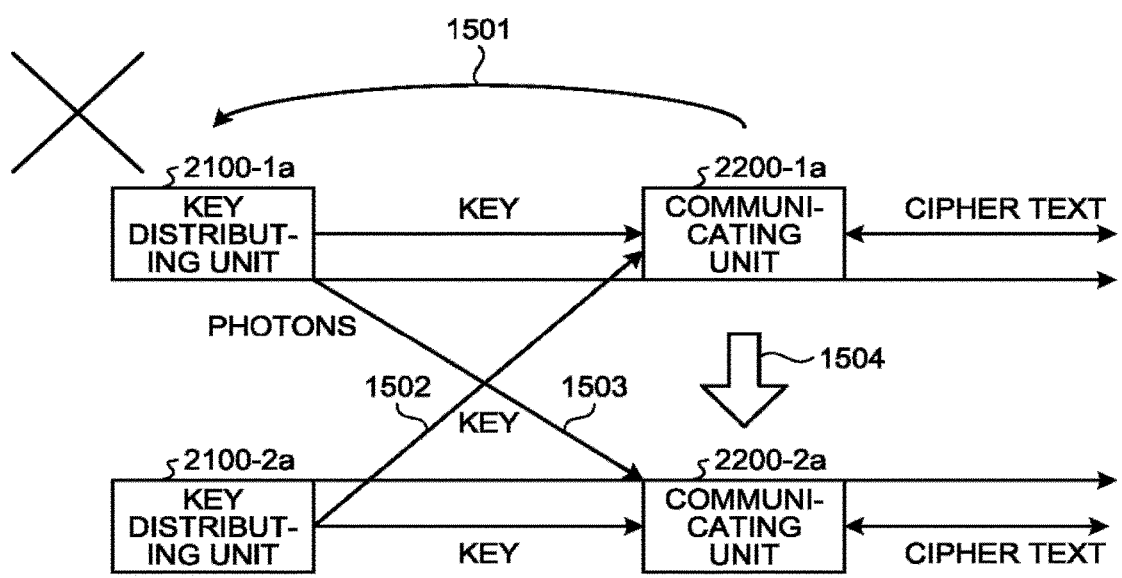
FIG. 15 is a diagram for explaining a redundancy control method of the pattern A.

FIG. 15 is a diagram for explaining a redundancy control method of the pattern A. Herein, the fundamental redundancy control method is identical to the method explained in the first embodiment. The following explanation is given about an additional control method. The pattern A is effective regardless of whether the communication device 210 is configured according to the A/A method or according to the A/S method.

(A1) The communicating unit 2200-1a (the monitoring unit 2211) periodically monitors the key distributing unit 2100-1a (an arrow 1501). For example, the communicating unit 2200-1a monitors that the key distributing unit 2100-1a is running normally or that the key distributing unit 2100-1a is not in a failure state. Whether or not the key distributing unit 2100-1a is running normally is determined depending on, for example, "whether keys can be obtained from the key distributing unit 2100-1a", "whether the number of keys obtainable from the key distributing unit 2100-1a is equal to or greater than a threshold value", and "whether the photon transmission or the key distillation control data communication performed by the key distributing unit 2100-1a is successful".

(A2) If a failure is detected in the key distributing unit 2100-1a, the communicating unit 2200-1a (the switching unit 2212) does not obtain keys from the key distributing unit 2100-1a and switches the key obtaining destination so as to obtain the keys from the key distributing unit 2100-2a (an arrow 1502). Hence, the key distributing unit 2100-2a has to provide the keys to the communicating unit 2200-2a as well as the communicating unit 2200-1a. For that reason, the key distributing unit 2100-2a takes into account the processing traffic volume and the priority with the communicating units 2200-2a and 2200-1a, and accordingly decides on the number of keys to be provided to the two communicating units.

(A2-1) Moreover, the communicating unit 2200-1a makes a change such that the key generation traffic from the key distributing unit 2100-1a does not pass through the communicating unit 2200-1a but passes through the communicating unit 2200-2a (an arrow 1503). The reason for the occurrence of a failure in the key distributing unit 2100-1a can sometimes be unsuccessful communication of the key generation traffic, and the reason for unsuccessful communication sometimes lies in the communicating unit 2200-1a present in the path. In that case, as a result of changing the path for the key generation traffic, normal communication of the key generation traffic becomes possible. Thus, the key generation of the key distributing unit 2100-1a becomes successful, thereby enabling its revival from the failure state.

(A2-2) In the method, control can be performed in such a way that the communicating unit 2200-1a further hands over the active state to the communicating unit 2200-2a, and thus the communicating unit 200-2a becomes active (an arrow 1504). When the key generation is not performed normally in the key distributing unit 2100-1a, the reason for that can to present in the communicating unit 2200-1a itself, that is, a failure may have occurred in the communicating unit 2200-1a itself. In order to avoid such a failure, the communicating unit 2200-2a is made active.

(A2-3) The reason for the occurrence of a failure in the key distributing unit 2100-1a can be a failure in the key distributing unit 2100-1a itself or can be a failure in the key distributing unit 2100-1b (the receiver) installed at the base location PB. That is because the generation of keys using quantum key distribution requires that the transmitter as well as the receiver is operating normally. Thus, regarding the receiver to be used at the time of quantum key distribution performed by the key distributing unit 2100-1a (the transmitter), the switching unit 2212 can switch the receiver from the key distributing unit 2100-1b to another key distributing unit (for example, the key distributing unit 2100-2b); so that quantum key distribution can be separately performed. At (A2) explained above, if the reason for a failure in the key distributing unit 2100-1a lies in the key distributing unit 2100-1b, the switching of the key distributing unit (the receiver) may result in the revival of the key distributing unit 2100-1a to perform normal operations.

(A3) Accompanying a change in the key provision destination and the key obtaining destination, key synchronization becomes necessary. Thus, the key distributing unit 2100-2a, the communicating unit 2200-1a, or the communicating unit 2200-2a performs the necessary key synchronization with the key distributing unit 100 or the communicating unit 2200 installed at the base location PB, for example.

Meanwhile, in (A1) to (A3) is illustrated a sequence in which the communicating unit 2200-1a monitors the key distributing unit 2100-1a. At the same time, a sequence in which the communicating unit 2200-2a monitors the key distributing unit 2100-2a can also be implemented.

Pattern B

Figure 16:
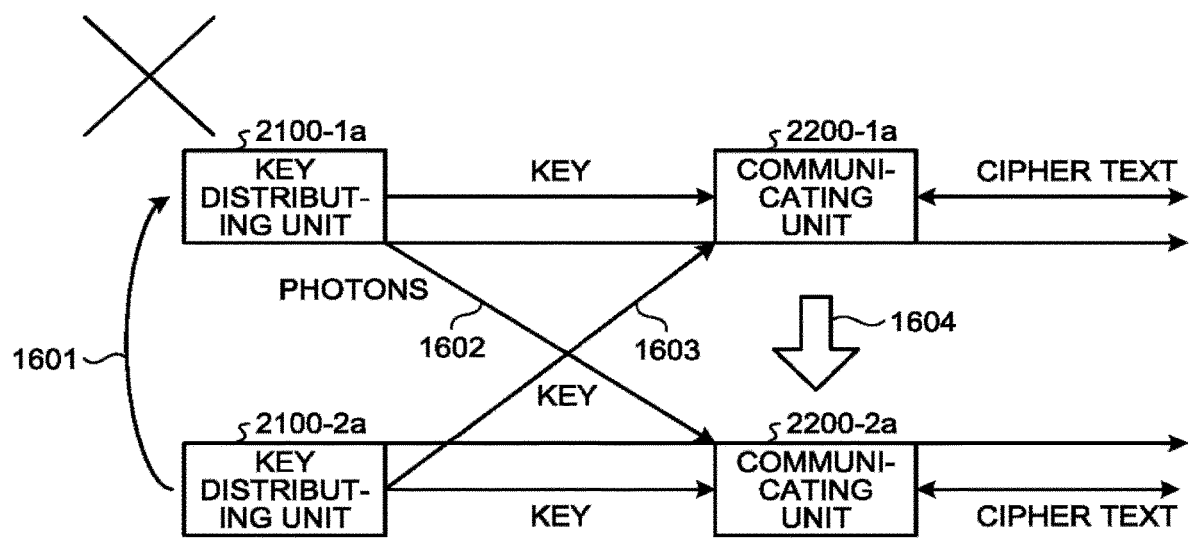
FIG. 16 is a diagram for explaining a redundancy control method of the pattern B.

FIG. 16 is a diagram for explaining a redundancy control method of the pattern B. Herein, the fundamental redundancy control method is identical to the method explained in the first embodiment. The following explanation is given about an additional control method. The pattern B is effective regardless of whether the communication device 210 is configured according to the A/A method or according to the A/S method.

(B1) The key distributing unit 2100-2a (the monitoring unit 2111) periodically monitors the key distributing unit 2100-1a (an arrow 1601). For example, the key distributing unit 2100-2a monitors that the key distributing unit 2100-1a is running normally or that the key distributing unit 2100-1a is not in a failure state. Whether or not the key distributing unit 2100-1a is running normally is determined depending on, for example, "whether the key distributing unit 2100-1a is generating keys", "whether the number of keys generated by the key distributing unit 2100-1a is equal to or greater than a threshold value", and "whether the photon transmission or the key distillation control data communication performed by the key distributing unit 2100-1a is successful".

(B2) If a failure is detected in the key distributing unit 2100-1a, the key distributing unit 2100-2a (the switching unit 2112) switches the key provision destination so as to provide the keys to the communicating unit 2200-1a too on behalf of the key distributing unit 2100-1a (an arrow 1603). Hence, the key distributing unit 2100-2a has to provide the keys to the communicating unit 2200-2a as well as the communicating unit 2200-1a. For that reason, the key distributing unit 2100-2a takes into account the processing traffic volume and the priority with the communicating units 2200-2a and 2200-1a, and accordingly decides on the number of keys to be provided to the two communicating units.

(B2-1) Moreover, the key distributing unit 2100-2a switches the path for key generation traffic in the key distributing unit 2100-1a from a path via the communicating unit 2200-1a to a path via the communicating unit 2200-2a (an arrow 1602). The reason for the occurrence of a failure in the key distributing unit 2100-1a can sometimes be unsuccessful communication of the key generation traffic, and the reason for unsuccessful communication sometimes lies in the communicating unit 2200-1a present in the path. In that case, as a result of changing the path for the key generation traffic, normal communication of the key generation traffic becomes possible. Thus, the key generation of the key distributing unit 2100-1a becomes successful, thereby enabling its revival from the failure state.

(B2-2) In the A/S method, control can be performed in such a way that the communicating unit 2200-1a further hands over the active state to the communicating unit 2200-2a and thus the communicating unit 2200-2a becomes active (an arrow 1604). When the key generation is not performed normally in the key distributing unit 2100-1a, the reason for that can be present in the communicating unit 2200-1a itself, that is, a failure may have occurred in the communicating unit 2200-1a itself. In order to avoid such a failure, the communicating unit 2200-2a is made active.

(B2-3) The reason for the occurrence of a failure in the key distributing unit 2100-1a can be a failure in the key distributing unit 2100-1a itself or can be a failure in the key distributing unit 2100-1b (the receiver) installed at the base location PB. That is because the generation of keys using quantum key distribution requires that the transmitter as well as the receiver is operating normally. Thus, regarding the receiver to be used at the time of quantum key distribution performed by the key distributing unit 2100-1a (the transmitter), the switching unit 2112 can switch the receiver from the key distributing unit 2100-1b to another key distributing unit (for example, the key distributing unit 2100-2b); so that quantum key distribution can be separately performed. At (B2) explained above, if the reason for a failure in the key distributing unit 2100-1a lies in the key distributing unit 2100-1b, the switching of the key distributing unit (the receiver) may result in the revival of the key distributing unit 2100-1a to perform normal operations.

(B3) Accompanying a change in the key provision destination and the key obtaining destination, key synchronization becomes necessary. Thus, the key distributing unit 2100-2a, the communicating unit 2200-1a, or the communicating unit 2200-2a performs the necessary key synchronization with the key distributing unit 2100 or the communicating unit 2200 installed at the base location PB, for example.

Meanwhile, in (B1) to (B3) is illustrated a sequence in which the key distributing unit 2100-2a monitors the key distributing unit 2100-1a. At the same time, a sequence in which the key distributing unit 2100-1a monitors the key distributing unit 2100-2a can also be implemented.

Moreover, in the pattern B, the monitoring side as well as the redundancy achieving side includes the key distributing unit 2100. Hence, using the existing communication devices, a redundant configuration can be achieved just by adding the key distributing unit 2100 according to the second embodiment (and a storage device depending on the situation).

Pattern C

Figure 17:
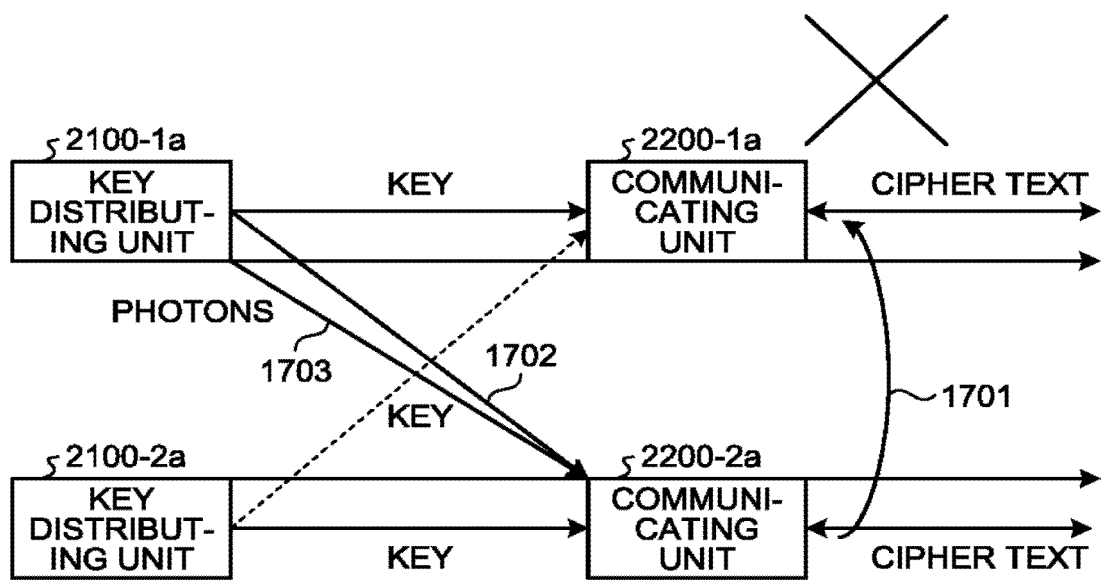
FIG. 17 is a diagram for explaining a redundancy control method of the pattern C.

FIG. 17 is a diagram for explaining a redundancy control method of the pattern C. Herein, the fundamental redundancy control method is identical to the method explained in the first embodiment. The following explanation is given about an additional control method. The pattern is effective regardless of whether the communication device 210 is configured according to the A/A method or according to the A/S method.

(C1) The communicating unit 2200-2*a* (the monitoring unit 2211) periodically monitors the communicating unit 2200-1*a* (an arrow 1701). For example, the communicating unit 2200-2*a* monitors that the communicating unit 2200-1*a* is running normally or that the communicating unit 2200-1*a* is not in a failure state. Whether or not the communicating unit 2200-1*a* is running normally is determined depending on, for example, "whether the communicating unit 2200-1*a* is obtaining keys", "whether the number of keys obtained by the communicating unit 2200-1*a* is equal to or greater than a threshold value", and "whether the photon transmission or the key distillation control data communication performed by the key distributing unit 2100-1*a* is successful".

(C2) If a failure is detected in the communicating unit 2200-1*a*, then it is the communicating unit 2200-2*a* that transfers all of the communication traffic. In the A/A method, the communicating unit 2200-2*a* operates as the main communicating unit on behalf of the communicating unit 2200-1*a*. In the A/S method, the communicating unit 2200-2*a* becomes active on behalf of the communicating unit 2200-1*a*. Regarding the provision of keys, in the A/A method, the key distributing unit 2100-1*a* provides the keys to the communicating unit 2200-1*a*, and the key distributing unit 2100-2*a* provides the keys to the communicating unit 2200-2*a*. If a failure occurs in the communicating unit 2200-1*a*, the key distributing unit 2100-1*a* provides the keys not to the communicating unit 2200-1*a* but to the communicating unit 2200-2*a*. In the A/S method, the key distributing units 2100-1*a* and 2100-2*a* provide the keys to the communicating unit 2200-1*a*. If a failure occurs in the communicating unit 2200-1*a*, the key distributing units 2100-1*a* and 2100-2*a* provide the keys to the communicating unit 2200-2*a*. As a result, regardless of whether the A/A method is implemented or the A/S method is implemented, updating is so done that the communicating unit 2200-2*a* obtains all keys from the key distributing units 2100-1*a* and 2100-2*a* (an arrow 1702).

(C2-1) Moreover, the communicating unit 2200-2*a* switches the path for key generation traffic in the key distributing unit 2100-1*a* from a path via the communicating unit 2200-1*a* to a path via the communicating unit 2200-2*a* (an arrow 1703). The reason for the occurrence of a failure in the key distributing unit 2100-1*a* can sometimes be unsuccessful communication of the key generation traffic, and the reason for unsuccessful communication sometimes lies in the communicating unit 2200-1*a* present in the path. In that case, as a result of changing the path for the key generation traffic, normal communication of the key generation traffic becomes possible. Thus, the key generation of the key distributing unit 2100-1*a* becomes successful, thereby enabling its revival from the failure state.

(C3) Accompanying a change in the key provision destination and the key obtaining destination, key synchronization becomes necessary. Thus, the key distributing unit 2100-1*a*, the communicating unit 2200-1*a*, or the communicating unit 2200-2*a* performs the necessary key synchronization with the key distributing unit 2100 or the communicating unit 2200 installed at the base location PB, for example.

Meanwhile, in (C1) to (C3) is illustrated a sequence in which the communicating unit 2200-2*a* monitors the communicating unit 2200-1*a*. At the same time, a sequence in which the communicating unit 2200-1*a* monitors the communicating unit 2200-2*a* can also be implemented.

Pattern D

Figure 18:
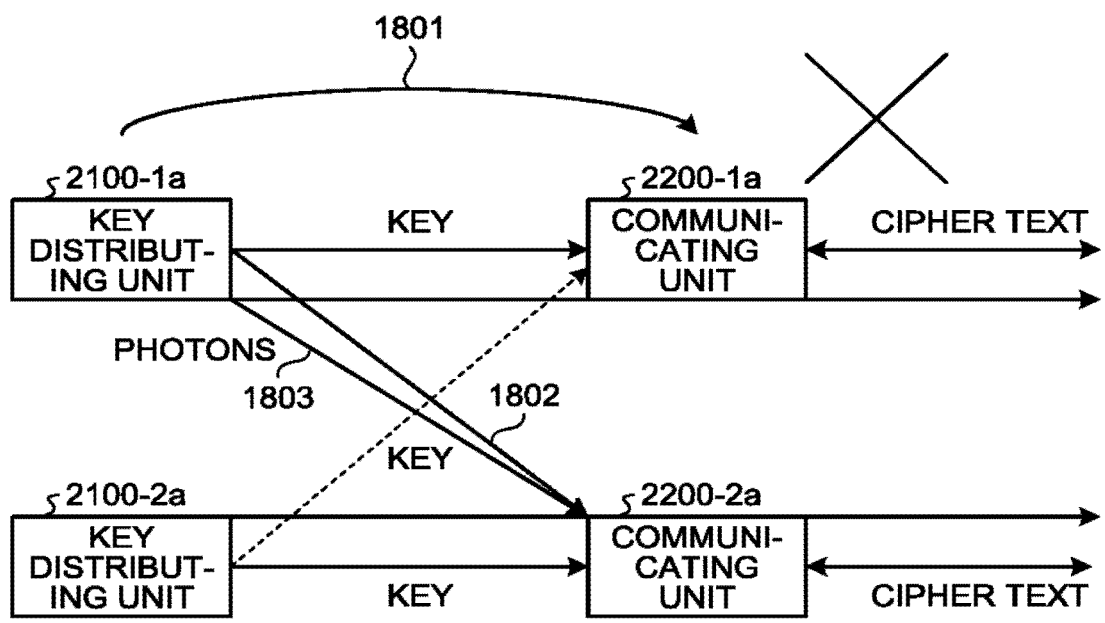
FIG. 18 is a diagram for explaining a redundancy control method of the pattern D.

FIG. 18 is a diagram for explaining a redundancy control method of the pattern D. Herein, the fundamental redundancy control method is identical to the method explained in the first embodiment. The following explanation is given about an additional control method. The pattern D is effective regardless of whether the communication device 210 is configured according to the A/A method or according to the A/S method.

(D1) The key distributing unit 2100-1*a* periodically monitors the communicating unit 2200-1*a* (an arrow 1801). For example, the key distributing unit 2100-1*a* monitors that the communicating unit 2200-1*a* is running normally or that the communicating unit 2200-1*a* is not in a failure state. Whether or not the communicating unit 2200-1*a* is running normally is determined depending on, for example, "whether the communicating unit 2200-1*a* is obtaining keys" and "whether the number of keys obtained by the communicating unit 2200-1*a* is equal to or greater than a threshold value".

(D1-1) Moreover, the key distributing unit 2100-1*a* monitors whether the communication including transmission and reception of the key generation traffic performed via the communicating unit 2200-1*a* is successful. For example, the key distributing unit 2100-1*a* monitors the quantum key distribution parameters, such as the photon detection rate in photon transmission.

(D2) If a failure is detected in the communicating unit 2200-1*a*, then it is the communicating unit 2200-2*a* that transfers all of the communication traffic on behalf of the communicating unit 2200-1*a*. In the A/A method, the communicating unit 2200-2*a* operates as the main communicating unit on behalf of the communicating unit 2200-1*a*. In the A/S method, the communicating unit 2200-2*a* becomes active on behalf of the communicating unit 2200-1*a*. Regarding the provision of keys, in the A/A method, the key distributing unit 2100-1*a* provides the keys to the communicating unit 2200-1*a*, and the key distributing unit 2100-2*a* provides the keys to the communicating unit 2200-2*a*. If a failure occurs in the communicating unit 2200-1*a*, the key distributing unit 2100-1*a* provides the keys not to the communicating unit 2200-1*a* but to the communicating unit 2200-2*a*. In the A/S method, the key distributing units 2100-1*a* and 2100-2*a* provide the keys to the communicating unit 2200-1*a*. If a failure occurs in the communicating unit 2200-1*a*, the key distributing units 2100-1*a* and 100-2*a* provide the keys to the communicating unit 2200-2*a*. As a result, regardless of whether the A/A method is implemented or the A/S method is implemented, updating is so done that the communicating unit 2200-2*a* obtains all keys from the key distributing units 2100-1*a* and 2100-2*a* (an arrow 1802).

(D2-1) Moreover, the key distributing unit 2100-1*a* itches the path for key generation traffic from a path via the communicating unit 2200-1*a* to a path via the communicating unit 2200-2*a* (an arrow 1803).

(D3) Accompanying a change in the key provision destination and the key obtaining destination, key synchronization becomes necessary. Thus, the key distributing unit 2100-1a, the communicating unit 2200-1a, or the communicating unit 2200-2a performs the necessary key synchronization with the key distributing unit 2100 or the communicating unit 2200 installed at the base location PB, for example.

Meanwhile, in (D1) to (D3) is illustrated a sequence in which the key distributing unit 2100-1a monitors the communicating unit 2200-1a. At the same time, a sequence in which the key distributing unit 2100-2a monitors the communicating unit 2200-2a can also be implemented.

In this way, in the second embodiment, it becomes possible to achieve a redundant configuration in the communication system in which photon transmission and key distillation control data passes through communicating units.

Third Embodiment

A communication device according to a third embodiment achieves a redundant configuration in a communication system in which key storing units are disposed in between key distributing units and communicating units.

Figure 19:
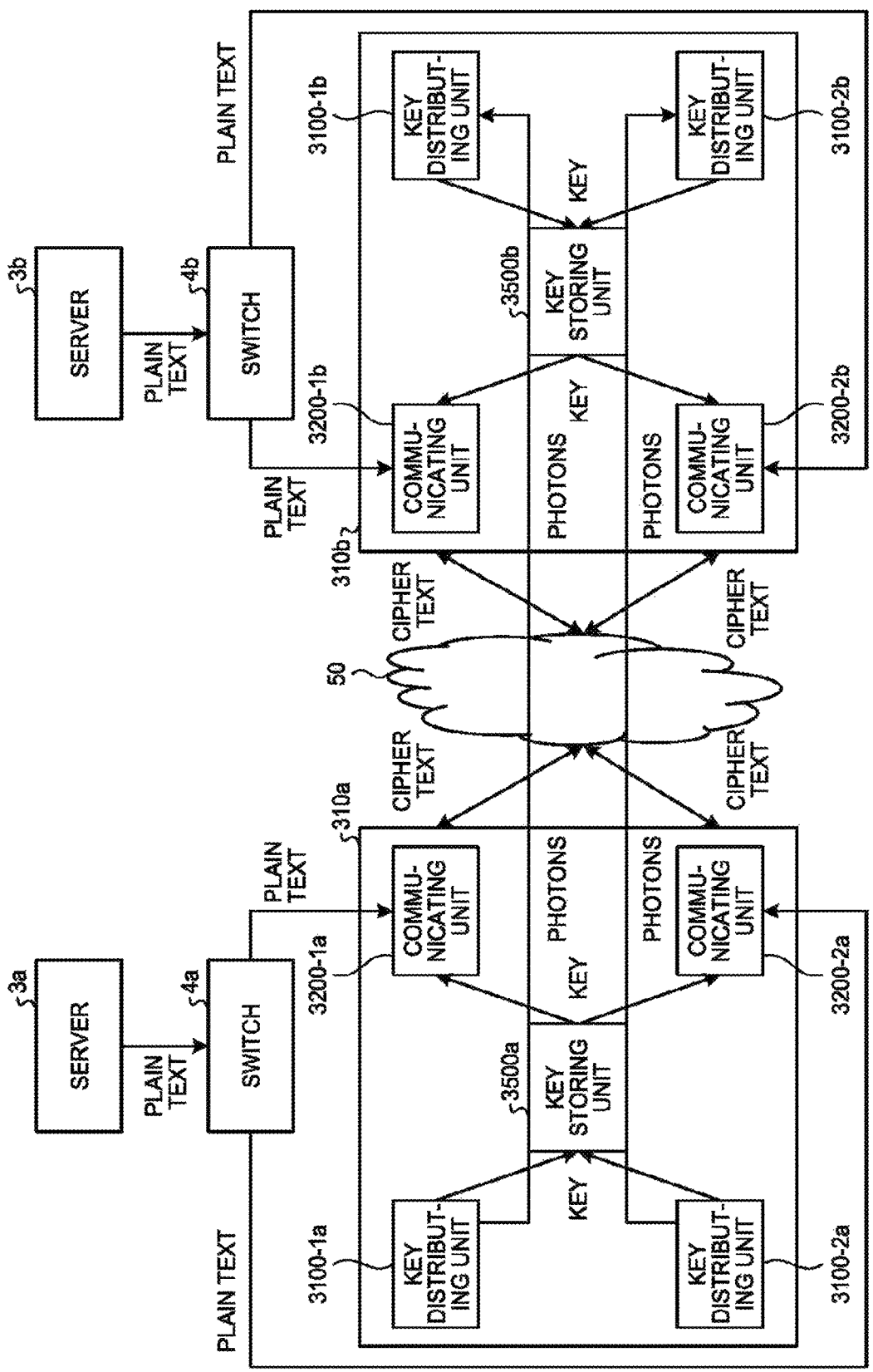
FIG. 19 is a diagram illustrating an exemplary configuration of a communication system according to a third embodiment.

FIG. 19 is a diagram illustrating an exemplary configuration of a communication system according to the third embodiment. As illustrated in FIG. 19, the communication system according to the third embodiment includes communication devices 310a and 310b, the servers 3a and 3b, the switches 4a and 4b, and the network 50. The communication device 310a, the server 3a, and the switch 4a are installed at the base location PA, for example. The communication device 210b, the server 3b, and the switch 4b are installed at the base location PB, for example. The configuration identical to the first embodiment is referred to by the same reference numerals, and the explanation is not repeated.

The communication device 310a includes key distributing units 3100-1a and 3100-2a, communicating units 3200-1a and 3200-2a, and a key storing unit 3500a. The key distributing units 3100-1a and 3100-2a have the functions equivalent to the key distributing unit 1a illustrated in FIG. 4. That is the key distributing units 3100-1a and 3100-2a have the quantum key distribution function for sharing quantum keys with external key distributing units 3100-1b and 3100-2b (examples of an external distribution device). The communicating units 3200-1a and 3200-2a have the functions equivalent to the communicating unit 2a illustrated in FIG. 4. That is, the communicating units 3200-1a and 3200-2a have the function of communicating with external communicating units 3200-1b and 3200-2b (examples of an external communication device) using the shared quantum keys.

In an identical manner, the communication device 310b includes the key distributing units 3100-1b and 3100-2b, the communicating units 3200-1b and 3200-2a, and a key storing unit 3500b. The key distributing units 3100-1b and 3100-2b have the functions equivalent to the key distributing unit 1b illustrated in FIG. 4. The communicating units 3200-1b and 3200-2b have the functions equivalent to the communicating unit 2b illustrated in FIG. 4.

In this way, the communication system illustrated in FIG. 19 is equivalent to a configuration in which, in the QKD communication infrastructure system illustrated in FIG. 4, the key distributing units 1 as well as the communicating units 2 are made redundant (are duplicated). In the third embodiment, the cryptographic communication between the system installed at the base location PA and the system installed at the base location PB is achieved with a redundant configuration.

The difference with the first embodiment is in the presence of the key storing units 3500 in between the key distributing units 3100 and the communicating units 3200. At the base location PA, the keys generated by the key distributing units 3100-1a and 3100-2a are transmitted to and stored in the key storing unit 3500a. The keys stored in the key storing unit 3500a are then transmitted to the communicating unit 3200-1a or the communicating unit 3200-2a, and are used in cryptographic communication. At the base location PB, the keys generated by the key distributing units 3100-1b and 3100-2b are transmitted to and stored in the key storing unit 3500b. The keys stored in the key storing unit 3500b are then transmitted to the communicating unit 3200-1b or the communicating unit 3200-2b, and are used in cryptographic communication.

Other than the explanation given herein, the remaining functions are identical to the explanation given with reference to FIG. 6 according to the first embodiment. In the configuration illustrated in FIG. 19, although the key storing units 3500 are not made redundant (are not duplicated), it is also possible to have a configuration in which the key storing units 3500 are made redundant (are duplicated).

Figure 20:
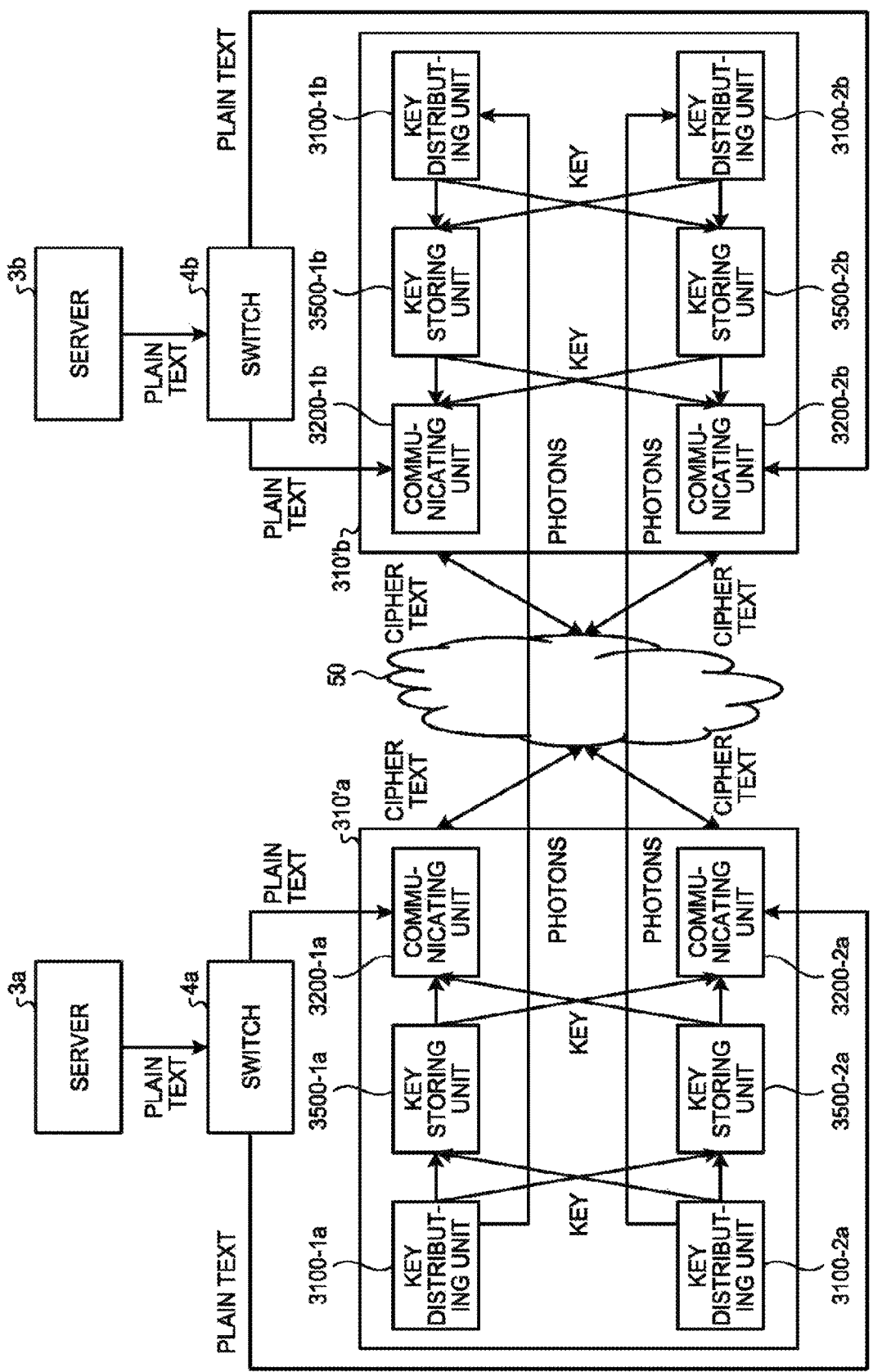
FIG. 20 is a diagram illustrating an exemplary configuration of a communication system according to a modification example of the third embodiment.

FIG. 20 is a diagram illustrating an exemplary configuration of a communication system according to a modification example of the third embodiment. As illustrated in FIG. 20, the communication system according to the modification example includes communication device 310'a and 310'b, the servers 3a and 3b, the switches 4a and 4b, and the network 50.

As compared to the communication device 310a illustrated in FIG. 19, the communication device 310'a differs in the way of including key storing units 3500-1a and 3500-2a that are made redundant. As compared to the communication device 310b illustrated in FIG. 19, the communication device 310'b differs in the way of including key storing units 3500-1b and 3500-2b that are made redundant. Other than that, the configuration is identical to that illustrated in FIG. 19. Hence, that explanation is not repeated.

In this way, the difference between the modification example and the first embodiment is the presence of the key storing units 3500 that are made redundant and are disposed in between the key distributing units 3100 and the communicating units 3200.

At the base location PA, the keys generated by the key distributing unit 3100-1a are eventually transmitted to the communicating unit 3200-1a or the communicating unit 3200-2a via the key storing unit 3500-1a or the key storing unit 3500-2a, and are used in cryptographic communication. Similarly, the keys generated by the key distributing unit 3100-2a are eventually transmitted to the communicating unit 3200-1a or the communicating unit 3200-2a via the key storing unit 3500-1a or the key storing unit 3500-2a, and are used in cryptographic communication.

At the base location PB, the keys generated by the key distributing unit 3100-1b are eventually transmitted to the communicating unit 3200-1b or the communicating unit 3200-2b via the key storing unit 3500-1b or the key storing unit 3500-2b, and are used in cryptographic communication. Similarly, the keys generated by the key distributing unit 3100-2b are eventually transmitted to the communicating unit 3200-1b or the communicating unit 3200-2b via the key storing unit 3500-1b or the key storing unit 3500-2b, and are used in cryptographic communication.

It is possible to think of various variations in the path for delivering the keys.

(Path R1) The key distributing unit 3100-1a provides the generated keys to the key storing unit 3500-1a, and the key storing unit 3500-1a provides the keys to the communicating unit 3200-1a. The key distributing unit 3100-2a provides the generated keys to the key storing unit 3500-2a, and the key storing unit 3500-2a provides the keys to the communicating unit 3200-2a.

If the configuration follows the path R1, then two completely independent key delivery flows are formed.

(Path R2) The key distributing unit 3100-1a provides the generated keys to the key storing units 3500-1a and 3500-2a. That is, the key distributing unit 3100-1a transmits the same keys to the two key storing units 3500 for storing purposes. In the key storing units 3500, the function for providing the keys to the communication device 310 is implemented according to the A/S format. That is, only one of the key storing units 3500-1a and 3500-2a becomes active and provides the keys to the communicating units 3200-1a and 3200-2a.

If the configuration follows the path R2, duplication of the key storing units 3500 is achieved thereby enabling securing redundancy. At the same time, the provision of keys to the communication device 310 can be centralized. The path R2 is equivalent to the configuration in which the key storing units 3500 are made redundant.

Given below is the explanation of the detailed functional configuration of the key distributing unit 3100 and the communicating unit 3200 according to the third embodiment. The following explanation is given with reference to the configuration according to the third embodiment (FIG. 19). In the modification example (FIG. 20), the configuration is identical except for the fact that the key storing units 3500 are made redundant.

Figure 21:
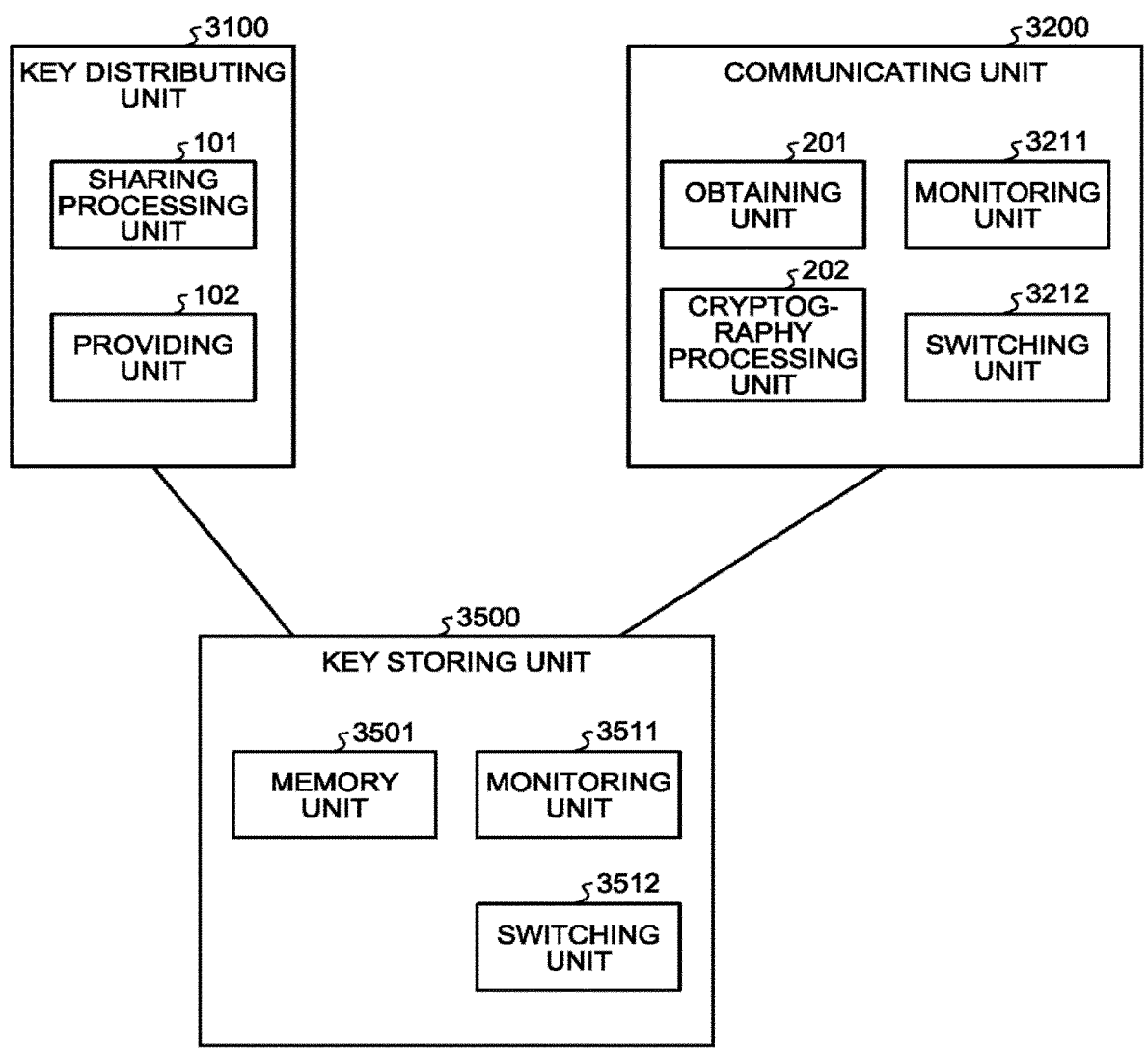
FIG. 21 is a diagram illustrating an exemplary functional configuration of a communication device according to the third embodiment.

FIG. 21 is a diagram illustrating an exemplary functional configuration of the communication device 310 according to the third embodiment. As illustrated in FIG. 21, the communication device 310 includes the key storing unit 3500 in addition to including the key distributing unit 3100 and the communicating unit 3200.

The key distributing unit 3100 includes the sharing processing unit 101 and the providing unit 102. The communicating unit 3200 includes the obtaining unit 201, the cryptography processing unit 202, a monitoring unit 3211, and a switching unit 3212. The key storing unit 3500 includes a memory unit 3501, a monitoring unit 3511, and a switching unit 3512.

As compared the first embodiment, the third embodiment differs in the way that the key distributing unit 3100 does not include the monitoring unit 111 and the switching unit 112 and that the functions of the monitoring unit 3211 and the switching unit 3212 are added along with the key storing unit 3500. The remaining configuration and functions are identical to FIG. 7 that is a block diagram of the communication device 10 according to the first embodiment. Hence, the same reference numerals are used, and the explanation is not repeated. Moreover, the flow of the switching operation according to the third embodiment is identical to the flow illustrated in FIG. 8 according to the first embodiment. Hence, that explanation is not repeated.

The monitoring unit 3211 monitors the operational status of the communication device 310. The switching unit 3212 switches between the communicating units 3200, which represent the control targets, according to the monitored operational status.

The memory unit 3501 of the key storing unit 3500 is used to store the generated keys. The memory unit 3501 can be configured using any commonly-used memory medium such as a hard disk drive (HDD), an optical disk, a memory card, and a random access memory (RAM).

The monitoring unit 3511 monitors the operational status of the communication device 310. The switching unit 3512 switches between the communicating units 3200, which represent the control targets, according to the monitored operational status.

In FIG. 21 is illustrated an example in which the key storing unit 3500 as well as the communicating unit 3200 includes the monitoring unit and the switching unit. Alternatively, the configuration can be such that, depending on whether the key storing unit 3500 is the control target or the communicating unit 3200 is the control target, the monitoring unit and the switching unit can be included in either the key storing unit 3500 or the communicating unit 3200. Regarding the operations for each combination of the monitoring-and-switching subject and the control target, the details are given later.

Given below is the explanation of a specific example of redundancy control. It is possible to think of following two patterns as the patterns of redundancy control according to the third embodiment and the modification example.

Pattern C: the communicating unit 3200 (the monitoring unit 3211) performs the monitoring, and redundancy of the communicating unit 3200 is achieved.

Pattern E: the key storing unit 3500 (the monitoring unit 3511) performs the monitoring, and redundancy of the communicating unit 3200 is achieved.

Other than these two patterns, the remaining patterns either are identical to the patterns explained earlier or do not require redundancy control. In the third embodiment and the modification example, regarding the redundancy of the key distributing units disposed at the previous stage of the key storing units 3500, the configuration is such that the key storing units 3500 conceal the redundancy.

The explanation is given below in order.

Pattern C

Figure 22:
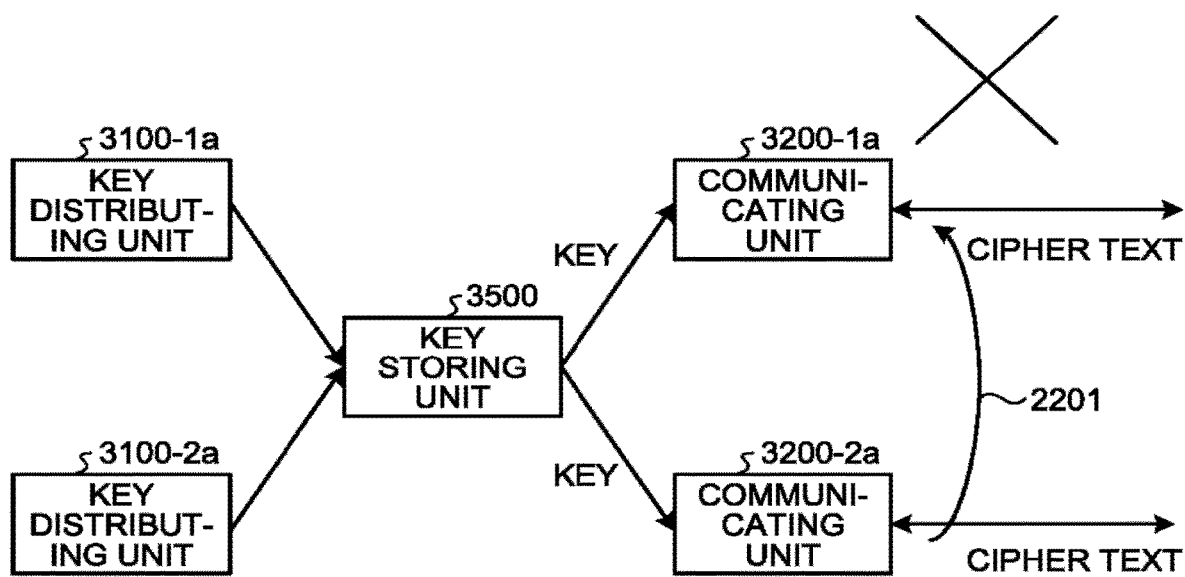
FIG. 22 is a diagram for explaining a redundancy control method of the pattern C.

FIG. 22 is a diagram for explaining a redundancy control method of the pattern C. Herein, the pattern C is effective regardless of whether the communication device 310 is configured according to the A/A method or according to the A/S method.

(C1) The communicating unit 3200-2a (the monitoring unit 3211) periodically monitors the communicating unit 3200-1a (an arrow 2201). For example, the communicating unit 3200-2a monitors that the communicating unit 3200-1a is running normally or that the communicating unit 3200-1a is not in a failure state. Whether or not the communicating unit 3200-1a is running normally is determined depending on, for example, "whether the communicating unit 3200-1a is obtaining keys", "whether the number of keys obtained by the communicating unit 3200-1a is equal to or greater than a threshold value", and "whether the photon transmission or the key distillation control data communication performed by the key distributing unit 3100-1a is successful".

(C2) If a failure is detected in the communicating unit 3200-1a, then it is the communicating unit 3200-2a that transfers all of the communication traffic. In the A/A method, the communicating unit 3200-2a operates as the main communicating unit on behalf of the communicating unit 3200-1a. In the A/S method, the communicating unit 3200-2a becomes active on behalf of the communicating unit 3200-1a. Regarding the provision of keys, in the A/A method, the key storing unit 3500 provides the keys to the communicating units 3200-1a and 3200-2a. If a failure occurs in the communicating unit 3200-1a, the key storing unit 3500 stops providing the keys to the communicating unit 3200-1a and provides all keys to the communicating unit 3200-2a. In the A/S method, the key storing unit 3500 provides the keys to the communicating unit 3200-1a. If a failure occurs in the communicating unit 3200-1a, the key storing unit 3500 stops providing the keys to the communicating unit 3200-1a and provides all keys to the communicating unit 3200-2a. As a result, regardless of whether the A/A method is implemented or the A/S method is implemented, updating is so done that the communicating unit 3200-2a obtains all keys from the key storing unit 3500.

(C3) Accompanying a change in the key provision destination and the key obtaining destination, key synchronization becomes necessary. Thus, the key storing unit 3500, the communicating unit 3200-1a, or the communicating unit 3200-2a performs the necessary key synchronization with the key storing unit 3500 or the communicating unit 3200 installed at the base location PB, for example.

Meanwhile, in (C1) to (C3) is illustrated a sequence in which the communicating unit 3200-2a monitors the communicating unit 3200-1a. At the same time, a sequence in which the communicating unit 3200-1a monitors the communicating unit 3200-2a can also be implemented.

Pattern E

Figure 23:
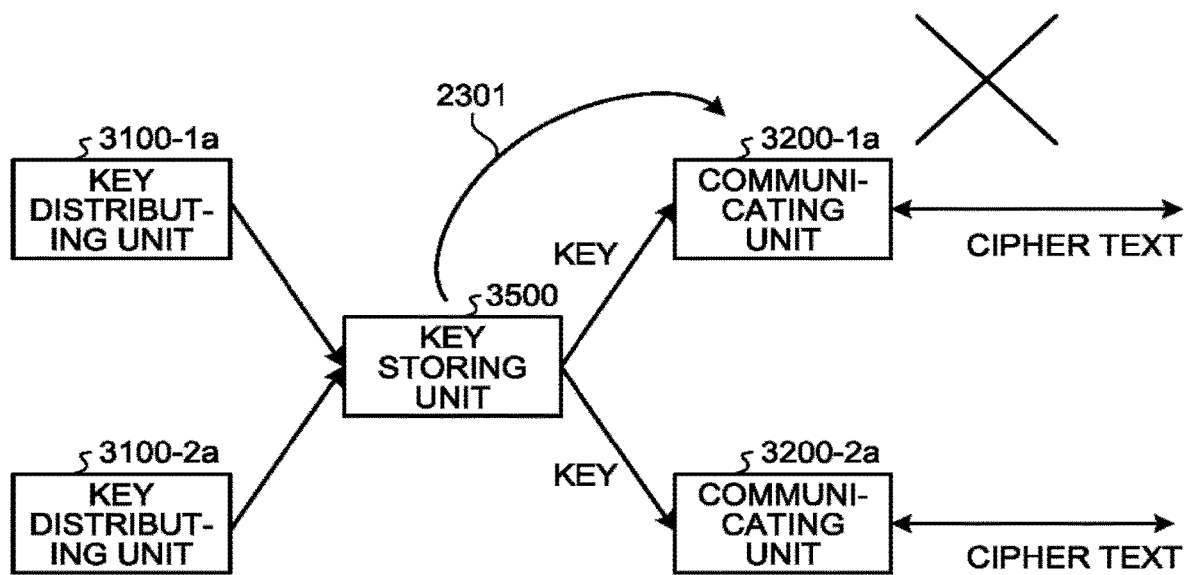
FIG. 23 is a diagram for explaining a redundancy control method of a pattern E.

FIG. 23 is a diagram for explaining a redundancy control method of the pattern E. Herein, the pattern E is effective regardless of whether the communication device 310 is configured according to the A/A method or according to the A/S method.

(E1) The key storing unit 3500 periodically monitors the communicating unit 3200-1a (an arrow 2301). For example, the key storing unit 3500 monitors that the communicating unit 3200-1a is running normally or that the communicating unit 3200-1a is not in a failure state. Whether or not the communicating unit 3200-1a is running normally is determined depending on, for example, "whether the communicating unit 3200-1a is obtaining keys" and "whether the number of keys obtained by the communicating unit 3200-1a is equal to or greater than a threshold value".

(E2) If a failure is detected in the communicating unit 3200-1a, then it is the communicating unit 3200-2a that transfers all of the communication traffic on behalf of the communicating unit 3200-1a. In the A/A method, the communicating unit 3200-2a operates as the main communicating unit on behalf of the communicating unit 3200-1a. In the A/S method, the communicating unit 3200-2a becomes active on behalf of the communicating unit 3200-1a. Regarding the provision of keys, in the A/A method, the key storing unit 3500 provides the keys to the communicating units 3200-1a and 3200-2a. If a failure occurs in the communicating unit 3200-1a, the key storing unit 3500 no more needs to provide the keys to the communicating unit 3200-1a and thus provides all keys to the communicating unit 3200-2a. In the A/S method, the key storing unit 3500 provides all keys to the communicating unit 3200-1a. If a failure occurs in the communicating unit 3200-1a, the key storing unit 3500 provides all keys to the communicating unit 3200-2a. As a result, regardless of whether the A/A method is implemented or the A/S method is implemented, updating is so done that the communicating unit 3200-2a obtains all keys from the key storing unit 3500.

(E3) Accompanying a change in the key provision destination and the key obtaining destination, key synchronization becomes necessary. Thus, the key storing unit 3500, the communicating unit 3200-1a, or the communicating unit 3200-2a performs the necessary key synchronization with the key distributing unit 3100 or the communicating unit 3200 installed at the base location PB, for example.

Meanwhile, in (E1) to (E3) is illustrated a sequence in which the key storing unit 3500 monitors the communicating unit 3200-1a. At the same time, a sequence in which the key storing unit 3500 monitors the communicating unit 3200-2a can also be implemented.

In this way, in the third embodiment, it becomes possible to achieve a redundant configuration in the communication system in which key storing units are disposed in between key distributing units and communicating units.

Fourth Embodiment

A communication device according to a fourth embodiment achieves a redundant configuration in a communication system that includes a device configured by integrating key distributing units and communicating units.

Figure 24:
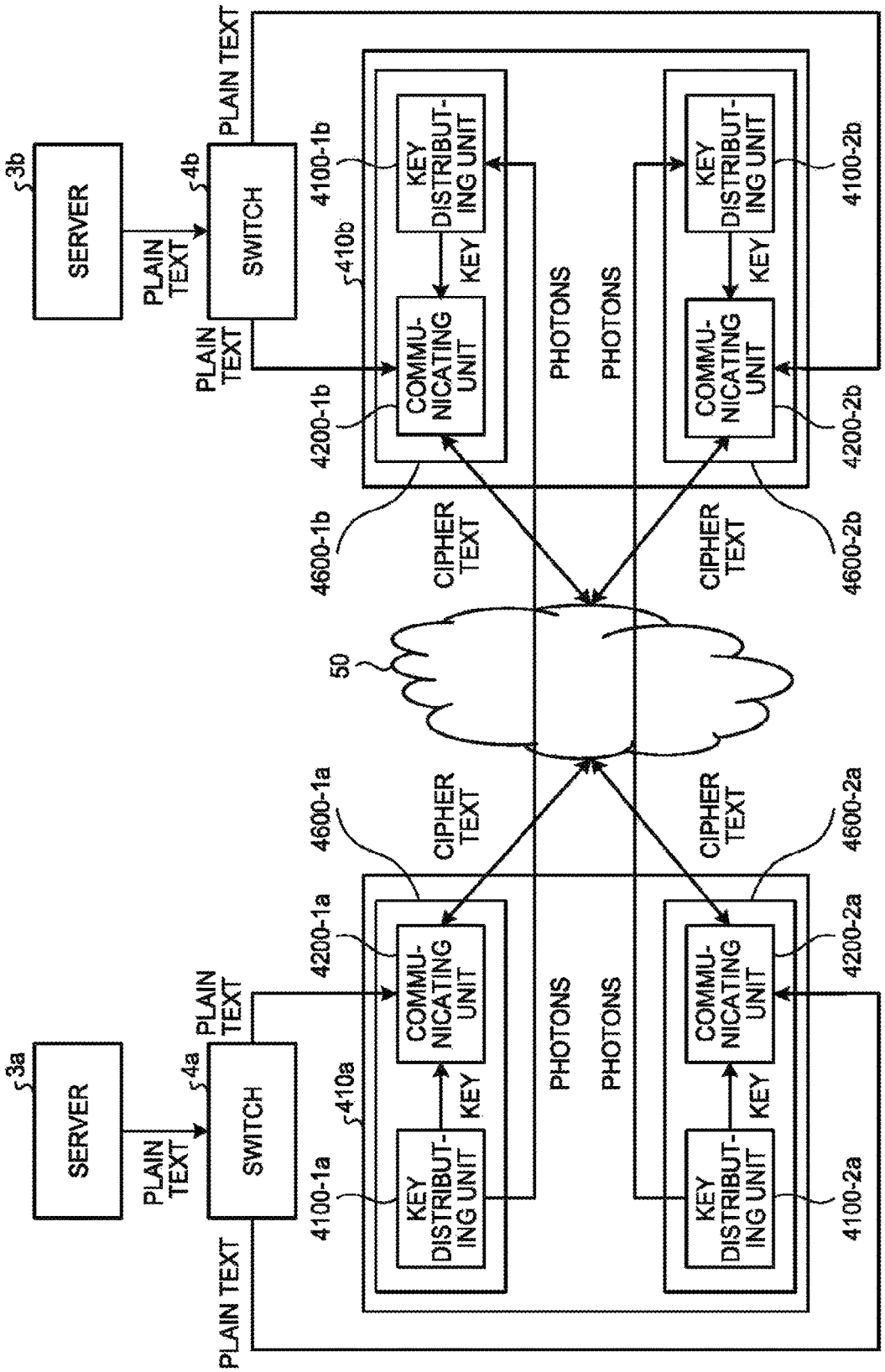
FIG. 24 is a diagram illustrating an exemplary configuration of a communication system according to a fourth embodiment.

FIG. 24 is a diagram illustrating an exemplary configuration of a communication system according to the fourth embodiment. As illustrated in FIG. 24, the communication system according to the fourth embodiment includes communication devices 410a and 410b, the servers 3a and 3b, the switches 4a and 4b, and the network 50. The communication device 410a, the server 3a, and the switch 4a are installed at the base location PA, for example. The communication device 410b, the server 3b, and the switch 4b are installed at the base location PB, for example. The configuration identical to the first embodiment is referred to by the same reference numerals, and the explanation is not repeated.

The communication device 410a includes communication control units 4600-1a and 4600-2a. The communication control unit 4600-1a includes a key distributing unit 4100-1a and a communicating unit 4200-1a. The communication control unit 4600-2a includes a key distributing unit 4100-2a and a communicating unit 4200-2a.

The key distributing units 4100-1a and 4100-2a have the functions equivalent to the key distributing unit 1a illustrated in FIG. 3. That is, the key distributing unit 4100-1a and 4100-2a have the quantum key distribution function for sharing quantum keys with external key distributing units 4100-1b and 4100-2b (examples of an external distribution device). The communicating units 4200-1a and 4200-2a have the functions equivalent to the communicating unit 2a illustrated in FIG. 3. That is, the communicating units 4200-1a and 4200-2a have the function of communicating with external communicating units 4200-1b and 4200-2b (examples of an external communication device) using the shared quantum keys.

In an identical manner, the communication device 410b includes communication control units 4600-1b and 4600-2b.

In this way, in the QKD communication infrastructure system illustrated in FIG. 3, the communication system illustrated in FIG. 24 is equivalent to a configuration in which the communication control unit 4600 formed by integrating the key distributing unit 1 and the communicating unit 2 is made redundant (is duplicated). Herein, integration implies, for example, installing the constituent elements in the physically same hardware (circuit or device). In the fourth embodiment, the cryptographic communication between the system installed at the base location PA and the system installed at the base location PB is implemented using a redundant configuration.

The constituent elements of the communication control unit 4600 are the key distributing unit 4100 and the communicating unit 4200. The transfer of keys from the key distributing unit 4100 to the communicating unit 4200 is done inside the communication control unit 4600. That is, the transfer of keys is not done across a plurality of constituent elements. The remaining configuration and functions are identical to the first embodiment (FIG. 6).

In order to achieve redundancy of the communication control unit 4600, it is possible to think of the possibility of implementing the A/A method as well as the A/S method. The following explanation is given about the base location PA.

In the A/A method, the communication control units 4600-1a and 4600-2a are operated at all times, and the load is dispersed between the two communication control units 4600. As a result, the traffic transfer capacity, the cryptography processing capacity, and the key generative capacity gets optimized. In case there occurs a failure in the form of termination or malfunctioning of either one of the communication control units 4600, only the communication control unit 4600 that has not terminated or is not malfunctioning is operated as the QKD cryptographic communication system. In the A/S method, only one of the communication control units 4600 (for example, only the communication control unit 4600-1a) is operated in normal time. Thus, the traffic transfer, the cryptography processing, and the key generation is entirely processed by the communication control unit 4600-1a. In case there occurs a failure in the form of termination or malfunctioning of the communication control unit 4600-1a, the communication control unit 4600-1b starts operations as the QKD cryptographic communication system on behalf of the communication control unit 4600-1a.

When the communication control units 4600-1a, 4600-2a, 4600-1b, and 4600-2b need not be distinguished from each other, they are sometimes simply referred to as the communication control unit 4600.

Figure 25:
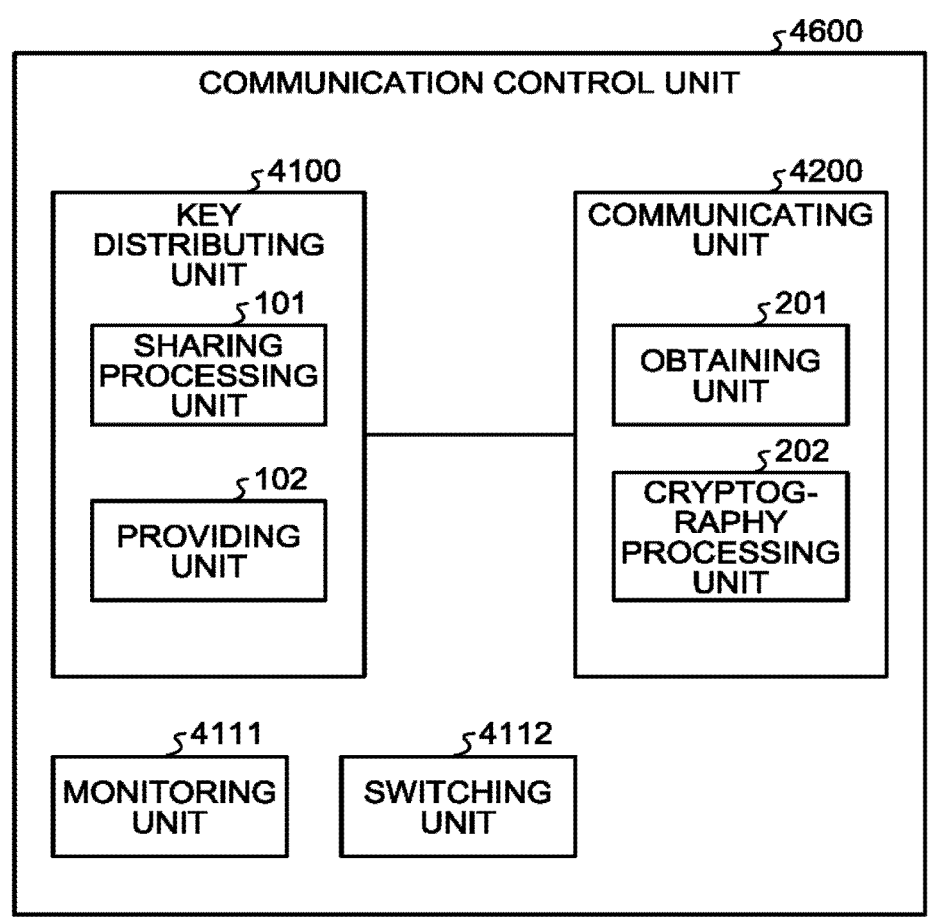
FIG. 25 is a diagram illustrating an exemplary functional configuration of a communication control unit according to the fourth embodiment.

Given below is the description of the detailed functional configuration of the communication control unit 4600 according to the fourth embodiment. FIG. 25 is a diagram illustrating an exemplary functional configuration of the communication control unit 4600 according to the fourth embodiment. As illustrated in FIG. 25, the communication control unit 4600 includes the key distributing unit 4100, the communicating unit 4200, a monitoring unit 4111, and a switching unit 4112.

The key distributing unit 4100 includes the sharing processing unit 101 and the providing unit 102. The communicating unit 4200 includes the obtaining unit 201 and the cryptographic processing unit 202.

In the fourth embodiment, the monitoring unit 4111 and the switching unit 4112 have different functions as compared to the functions in the first embodiment. The remaining configuration and functions are identical to FIG. 7 that is a block diagram of the communication device 10 according to the first embodiment. Hence, the same reference numerals are used, and the explanation is not repeated. Moreover, the flow of the switching operation according to the fourth embodiment is identical to the flow illustrated in FIG. 8 according to the first embodiment. Hence, that explanation is not repeated.

The monitoring unit 4111 monitors the operational a of the communication devices 410. The switching unit 4112 switches between the communication control units 4600, which represent the control targets, according to the monitored operational status.

Given below is the explanation of a specific example of redundancy control. It is possible to think of the following pattern as the pattern of redundancy control according to the fourth embodiment.

Pattern F: the communication control unit 4600 performs the monitoring, and redundancy of the communication control unit 4600 is achieved. The explanation is given below.

Pattern F

Figure 26:
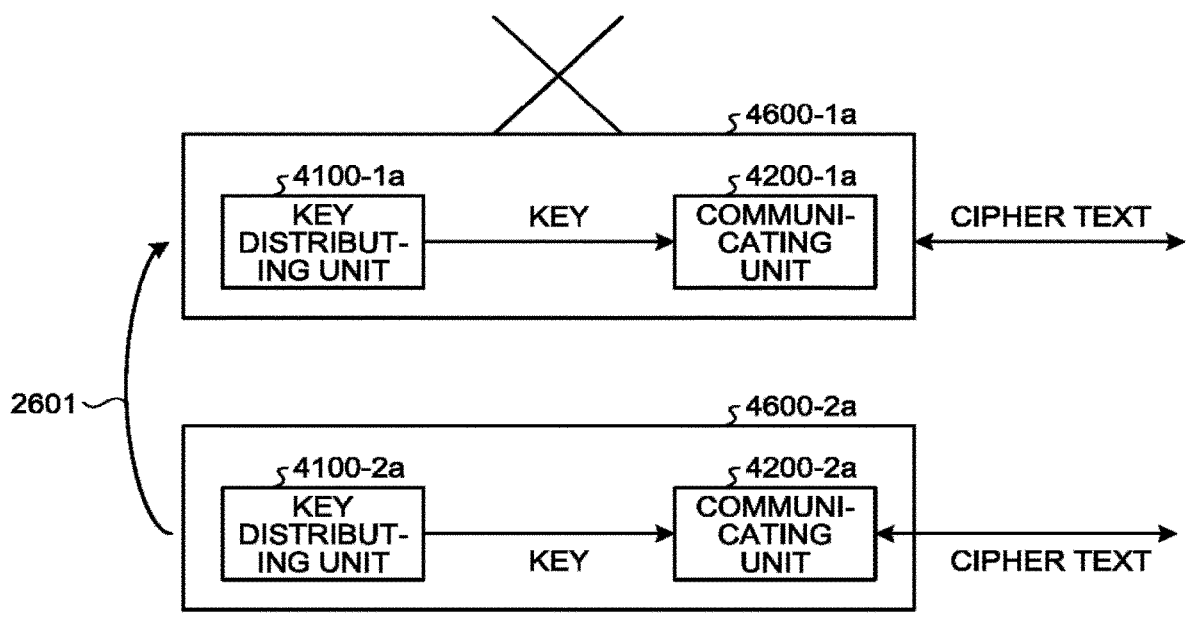
FIG. 26 is a diagram for explaining a redundancy control method of a pattern F.

FIG. 26 is a diagram for explaining a redundancy control method of the pattern F. Herein, the pattern F is effective regardless of whether the communication control unit 4600 is configured according to the A/A method or according to the A/S method.

(F1) The communication control unit 4600-2a periodically monitors the communication control unit 4600-1a (an arrow 2601). For example, the communication control unit 4600-2a monitors that the communication control unit 4600-1a is running normally or that the communication control unit 4600-1a is not in a failure state. Whether or not the communication control unit 4600-1a is running normally is determined depending on, for example, "whether the communication control unit 4600-1a is generating keys", "whether the number of keys generated by the communication control unit 4600-1a is equal to or greater than a threshold value", and "whether the photon transmission or the key distillation control data communication performed by the communication control unit 4600-1a is successful".

(F2) If a failure is detected in the communication control unit 4600-1a, then it is the communication control unit 4600-2a that transfers all of the communication traffic. In the A/A method, the communication control unit 4600-2a operates as the main communication control unit on behalf of the communication control unit 4600-1a. In the A/S method, the communication control unit 4600-2a becomes active on behalf of the communication control unit 4600-1a.

Meanwhile, in (F1) and (F2) is illustrated a sequence in which the communication control unit 4600-2a monitors the communication control unit 4600-1a. At the same time, a sequence in which the communication control unit 4600-1a monitors the communication control unit 4600-2a can also be implemented.

In this way, in the fourth embodiment, it becomes possible to achieve a redundant configuration in the communication system that includes a device configured by integrating key distributing units and communicating units.

In the embodiments described above, the explanation is given about achieving redundancy (duplication) using a dual system of the QKD systems S1 and S2. Alternatively, redundancy can be achieved using a triple system of QKD systems or more. Moreover, only either the communicating units or the key distributing units can be subjected to redundancy.

Moreover, in the embodiments described above, the explanation is given only about the behavior in response to the occurrence of a failure. Alternatively, the behavior can be for reverting to the original operations after recovering from a failure. For example, monitoring of the device in which a failure has occurred is done on a continuous basis and, when it is determined that the device has recovered from the failure, the operations for returning to the normal operations are performed.

Meanwhile, at the time of setting a redundant configuration, it is assumed that the settings related to the manner of performing duplication are done in advance. Examples of the settings include the type of the device functioning as the monitoring target (the control target), the Internet protocol (IP) address of the device, the type of the target items for monitoring, and the IP addresses of the devices partnering in the redundant configuration. For example, a device gets to know about the redundant configuration at the time of activation and, according to the settings, monitors the devices and decides on the behavior in the case of detecting a failure in the target device for monitoring.

Moreover, in the embodiments described above, the communicating unit, the key distributing unit, or the key storing unit represent the failure-monitoring subject. However, the failure-monitoring subject is not limited to those examples. That is, the subject can be present anywhere in the system. For example, the configuration can be such that a monitoring device different than the communication device is present in a separate system, and performs necessary monitoring and performs necessary control in response to the detection of a failure.

As explained above, according to the first to fourth embodiments, for example, even in the case in which a communication system implementing the quantum key distribution technology is used as the cryptographic communication infrastructure, it is possible to enhance the degree of reliability by achieving a redundant configuration (a duplicate configuration).

Figure 27:
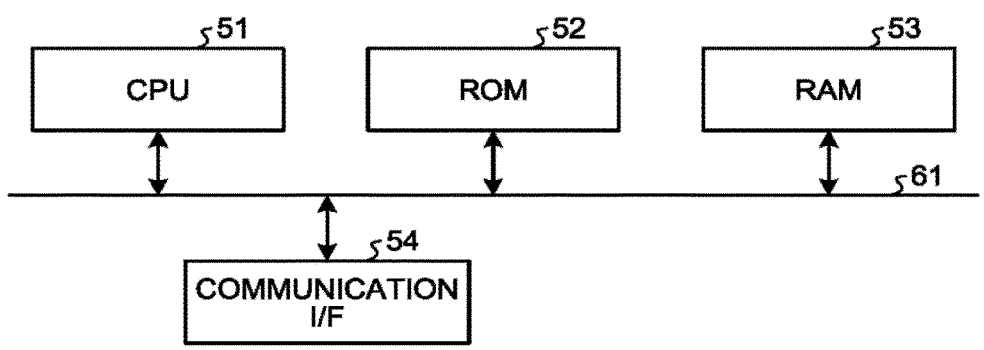
FIG. 27 is a hardware configuration diagram of the devices according to the first to fourth embodiments.

Explained below with reference FIG. 27 is a hardware configuration of the devices (the communication device and the monitoring device) according to the first to fourth embodiments. FIG. 27 is a diagram illustrating an exemplary hardware configuration of the devices according to the first to fourth embodiments.

The devices according to the first to fourth embodiments includes a control device such as a central processing unit (CPU) 51; memory devices such as a read only memory (ROM) 52 and a random access memory (RAM) 53; a communication interface (I/F) 54 that establishes connection with a network and performs communication; and a bus 61 that connects the constituent elements to each other.

The computer programs executed in the devices according to the first to fourth embodiments are stored in advance in the ROM 52.

Alternatively, the computer programs executed in the devices according to the first to fourth embodiments can be stored as installable or executable files in a computer-readable recording medium such as a compact disk read only memory (CD-ROM), a flexible disk (FD), a compact disk recordable (CD-R), or a digital versatile disk (DVD); and are provided as a computer program product.

Still alternatively, the computer programs executed in the devices according to the first to fourth embodiments can be stored in a downloadable manner in a computer that is connected to a network such as the Internet. Still alternatively, the computer programs executed in the devices according to the first to fourth embodiments can be distributed over a network such as the Internet.

The computer programs executed in the devices according to the first to fourth embodiments can make a computer to function as the constituent elements of the devices described above. In that computer, the CPU 51 can read the computer programs from a computer-readable memory medium into a main memory device, and can execute them.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A communication system, comprising:
a plurality of communication devices, wherein
each of the communication devices comprises:
    a plurality of key distributing units having a redundant configuration of a quantum key distribution function for sharing a quantum key with one external distribution device in another communication device, each of the plurality of key distributing units being implemented by one or more hardware processors;
    a plurality of communicating units having a redundant configuration of a communication function for communicating with the another communication device using the quantum key, each of the plurality of communicating units being implemented by one or more hardware processors; and
    a monitoring unit, implemented by one or more hardware processors, that monitors operational status indicating at least one of transmission-reception status of photons in the quantum key distribution function, generation status of generating the quantum key, and obtaining status of obtaining the quantum key, and that determines whether or not a failure occurs according to the operational status;
wherein a first communicating unit of the plurality of communicating units switches a key obtaining destination from a first key obtaining destination having a failure to a second key obtaining destination having no failure when the failure is determined to have occurred, the key obtaining destination representing one of the plurality of key distributing units from which the first communicating unit obtains the quantum key.

2. The communication system according to claim 1, wherein the monitoring unit
is included in each of the plurality of key distributing units, and
monitors operational status indicating at least one of transmission-reception status of photons in the quantum key distribution function and generation status of the quantum key.

3. The communication system according to claim 1, wherein the monitoring unit
is included in each of the plurality of communicating units, and
monitors operational status indicating obtaining status of obtaining the quantum key from the plurality of key distributing units.

4. The communication system according to claim 1, further comprising key storage that is used to store the quantum key which has been shared, wherein
the monitoring unit is included in the key storage.

5. A communication method implemented in a communication system comprising a plurality of communication devices, the communication method comprising:
sharing a quantum key with one external distribution device in another communication device by using a redundant configuration of a quantum key distribution function that a plurality of key distributing units has;
communicating, by a plurality of communicating units having a redundant configuration of a communication function, with the another communication device by using the quantum key, wherein each of the plurality of communication devices comprises the plurality of key distributing units and the plurality of communicating units;
monitoring operational status indicating at least one of transmission-reception status of photons in the quantum key distribution function, generation status of generating the quantum key, and obtaining status of obtaining the quantum key;

determining whether or not a failure occurs according to the operational status; and switching, by a first communicating unit of the plurality of communicating units, a key obtaining destination from a first key obtaining destination having a failure to a second key obtaining destination having no failure when the failure is determined to have occurred, the key obtaining destination representing one of the plurality of key distributing units from which the first communicating unit obtains the quantum key.

6. A communication system, comprising:
a plurality of communication devices, wherein each of the communication devices comprises:
   a plurality of key distributing units having a redundant configuration of a quantum key distribution function for sharing a quantum key with one external distribution device in another communication device, each of the plurality of key distributing units being implemented by one or more hardware processors;
   a plurality of communicating units having a redundant configuration of a communication function for communicating with the another communication device using the quantum key, each of the plurality of communicating units being implemented by one or more hardware processors; and
a monitoring unit, implemented by one or more hardware processors, that monitors operational status indicating at least one of transmission-reception status of photons in the quantum key distribution function, generation status of generating the quantum key, and obtaining status of obtaining the quantum key, and that determines whether or not a failure occurs according to the operational status;
wherein a first key distributing unit of the plurality of key distributing units (1) is provided with the quantum key from a second key distributing unit of the plurality of key distributing units, (2) provides the quantum key to a first communicating unit of the plurality of communicating units when the failure is determined not to have occurred, and (3) provides the quantum key to the first communicating unit and a second communicating unit of the plurality of communicating units when the failure is determined to have occurred, the second key distributing unit being one of the plurality of key distributing units having the failure.

7. A communication system, comprising:
a plurality of communication devices, wherein each of the communication devices comprises:
   a plurality of key distributing units having a redundant configuration of a quantum key distribution function for sharing a quantum key with one external distribution device in another communication device, each of the plurality of key distributing units being implemented by one or more hardware processors;
   a plurality of communicating units having a redundant configuration of a communication function for communicating with the another communication device using the quantum key, each of the plurality of communicating units being implemented by one or more hardware processors; and
a monitoring unit, implemented by one or more hardware processors, that monitors operational status indicating at least one of transmission-reception status of photons in the quantum key distribution function, generation status of generating the quantum key, and obtaining status of obtaining the quantum key, and that determines whether or not a failure occurs according to the operational status; wherein
a first key distributing unit of the plurality of key distributing units provides the quantum key to a first communicating unit of the plurality of communicating units when the failure is determined not to have occurred, and provides the quantum key to a second communicating unit of the plurality of communicating units when the failure is determined to have occurred in the first communicating unit.

8. A communication system, comprising:
a plurality of communication devices, wherein each of the communication devices comprises:
   a plurality of key distributing units having a redundant configuration of a quantum key distribution function for sharing a quantum key with one external distribution device in another communication device, each of the plurality of key distributing units being implemented by one or more hardware processors;
   a plurality of communicating units having a redundant configuration of a communication function for communicating with the another communication device using the quantum key, each of the plurality of communicating units being implemented by one or more hardware processors; and
a monitoring unit, implemented by one or more hardware processors, that monitors operational status indicating at least one of transmission-reception status of photons in the quantum key distribution function, generation status of generating the quantum key, and obtaining status of obtaining the quantum key, and that determines whether or not a failure occurs according to the operational status; wherein
a first key distributing unit of the plurality of key distributing units switches a key provision destination from a first key provision destination having a failure to a second key provision destination having no failure when the failure is determined to have occurred, the key provision destination representing one of the plurality of communicating units to which the first key distributing unit provides the quantum key.

9. A communication method implemented in a communication system comprising a plurality of communication devices, the communication method comprising:
   sharing a quantum key with one external distribution device in another communication device by using a redundant configuration of a quantum key distribution function that a plurality of key distributing units has;
   communicating, by a plurality of communicating units having a redundant configuration of a communication function, with the another communication device by using the quantum key, wherein each of the plurality of communication devices comprises the plurality of key distributing units and the plurality of communicating units;
   monitoring operational status indicating at least one of transmission-reception status of photons in the quantum key distribution function, generation status of generating the quantum key, and obtaining status of obtaining the quantum key;
   determining whether or not a failure occurs according to the operational status;
   providing, by a first key distributing unit of the plurality of key distributing units, the quantum key to a first communicating unit of the plurality of communicating units when the failure is determined not to have occurred; and providing, by the first key distributing unit, the quantum key to the first communicating unit and a second communicating unit of the plurality of communicating units when the failure is determined to have occurred, the second key distributing unit being one of the plurality of key distributing units having a failure and the quantum key having been provided to the first key distributing unit from the second key distributing unit.

10. A communication method implemented in a communication system comprising a plurality of communication devices, the communication method comprising:

sharing a quantum key with one external distribution device in another communication device by using a redundant configuration of a quantum key distribution function that a plurality of key distributing units has;

communicating, by a plurality of communicating units having a redundant configuration of a communication function, with the another communication device by using the quantum key, wherein each of the plurality of communication devices comprises the plurality of key distributing units and the plurality of communicating units;

monitoring operational status indicating at least one of transmission-reception status of photons in the quantum key distribution function, generation status of generating the quantum key, and obtaining status of obtaining the quantum key;

determining whether or not a failure occurs according to the operational status; and providing, by a first key distributing unit of the plurality of key distributing units, the quantum key to a first communicating unit of the plurality of communicating units when the failure is determined not to have occurred; and providing, by the first key distributing unit, the quantum key to a second communicating unit of the plurality of communicating units when the failure is determined to have occurred in the first communicating unit.

11. A communication method implemented in a communication system comprising a plurality of communication devices, the communication method comprising:

sharing a quantum key with one external distribution device in another communication device by using a redundant configuration of a quantum key distribution function that a plurality of key distributing units has;

communicating, by a plurality of communicating units having a redundant configuration of a communication function, with the another communication device by using the quantum key, wherein each of the plurality of communication devices comprises the plurality of key distributing units and the plurality of communicating units;

monitoring operational status indicating at least one of transmission-reception status of photons in the quantum key distribution function, generation status of generating the quantum key, and obtaining status of obtaining the quantum key;

determining whether or not a failure occurs according to the operational status; and switching, by a first key distributing unit of the plurality of key distributing units, a key provision destination from a first key provision destination having a failure to a second key provision destination having no failure when the failure is determined to have occurred, the key provision destination representing one of the plurality of communicating units to which the first key distributing unit provides the quantum key.

* * * * *